(12) United States Patent
Yau

(10) Patent No.: US 10,460,547 B2
(45) Date of Patent: Oct. 29, 2019

(54) TWO-WAY EXCHANGE VENDING

(71) Applicant: Tricopian, LLC, Carlsbad, CA (US)

(72) Inventor: Chi W. Yau, Escondido, CA (US)

(73) Assignee: Tricopian, LLC, Carlsbad, CA (US)

( * ) Notice: Subject to any disclaimer, the term of this patent is extended or adjusted under 35 U.S.C. 154(b) by 0 days.

(21) Appl. No.: 15/870,573

(22) Filed: Jan. 12, 2018

(65) Prior Publication Data

US 2018/0137715 A1 May 17, 2018

Related U.S. Application Data

(63) Continuation of application No. 14/386,762, filed as application No. PCT/US2013/030578 on Mar. 12, 2013, now Pat. No. 9,870,670.

(Continued)

(51) Int. Cl.
*G07F 7/06* (2006.01)
*G07F 15/00* (2006.01)
(Continued)

(52) U.S. Cl.
CPC .............. *G07F 7/06* (2013.01); *G06Q 10/30* (2013.01); *G06Q 20/18* (2013.01); *G06Q 20/3223* (2013.01); *G06Q 20/3224* (2013.01); *G07F 11/002* (2013.01); *G07F 15/003* (2013.01); *G07F 15/005* (2013.01); *G07F 15/006* (2013.01); *Y02W 90/20* (2015.05)

(58) Field of Classification Search
None
See application file for complete search history.

(56) References Cited

U.S. PATENT DOCUMENTS 2,119,063 A    5/1938  Wagner
4,700,375 A   10/1987  Reed
(Continued)

FOREIGN PATENT DOCUMENTS

CN        1496592 A    5/2004
CN      101083011 A   12/2007
(Continued)

OTHER PUBLICATIONS

International Search Report and Written Opinion dated Feb. 6, 2013 for Application No. PCT/US2011/065326.
(Continued)

*Primary Examiner* — Prasad V Gokhale
(74) *Attorney, Agent, or Firm* — Knobbe, Martens, Olson & Bear, LLP

(57) ABSTRACT

Two-way exchange vending can be performed by a two-way exchange based vending machine. The two-way exchange based vending machine can vend rechargeable batteries. The two-way exchange based vending machine can include different modules to perform different functionalities. The two-way exchange based vending machine can include a communications module, a dispensing module, a rejection module, and a receiving module. The communications module can communicate information to and receive inputs from a user. The dispensing module can dispense one or more rechargeable batteries or other requested products to a user. The receiving module can receive one or more rechargeable batteries from a user.

9 Claims, 10 Drawing Sheets

Related U.S. Application Data

(60) Provisional application No. 61/613,415, filed on Mar. 20, 2012.

(51) Int. Cl.
  *G06Q 10/00* (2012.01)
  *G06Q 20/32* (2012.01)
  *G07F 11/00* (2006.01)
  *G06Q 20/18* (2012.01)

(56) References Cited

U.S. PATENT DOCUMENTS

| | | | |
|---|---|---|---|
| 4,907,250 A * | 3/1990 | Ricks | G07F 9/026 |
| | | | 194/217 |
| 5,298,346 A | 3/1994 | Gyenes | |
| 5,307,000 A | 4/1994 | Podrazhansky et al. | |
| 5,349,535 A | 9/1994 | Gupta | |
| 5,485,090 A | 1/1996 | Stephens | |
| 5,489,835 A | 2/1996 | Stephens et al. | |
| 5,525,439 A | 6/1996 | Huhndorff et al. | |
| 5,544,784 A * | 8/1996 | Malaspina | G07F 7/00 |
| | | | 221/135 |
| 5,572,110 A | 11/1996 | Dunstan | |
| 5,621,297 A | 4/1997 | Feldstein | |
| 5,631,536 A * | 5/1997 | Tseng | B60L 53/305 |
| | | | 320/137 |
| 5,694,019 A | 12/1997 | Uchida et al. | |
| 6,154,006 A * | 11/2000 | Hatanaka | B60L 53/305 |
| | | | 320/109 |
| 6,191,554 B1 | 2/2001 | Nakane et al. | |
| 6,303,248 B1 | 10/2001 | Peterson | |
| 6,370,844 B1 | 4/2002 | Stricker | |
| 6,618,644 B2 | 9/2003 | Bean | |
| 6,764,003 B1 | 7/2004 | Martschitsch et al. | |
| 6,822,422 B2 | 11/2004 | Sagawa | |
| 6,862,496 B2 * | 3/2005 | Fukuoka | G06Q 20/027 |
| | | | 235/379 |
| 7,119,517 B2 * | 10/2006 | Mikuriya | H01M 10/4257 |
| | | | 320/109 |
| 7,491,466 B2 | 2/2009 | Feddrix et al. | |
| 7,888,913 B1 | 2/2011 | Marty et al. | |
| 8,055,919 B2 | 11/2011 | Magnusson | |
| 9,096,141 B2 | 8/2015 | Soong et al. | |
| 2001/0001766 A1 | 5/2001 | Humphreys et al. | |
| 2001/0037207 A1 | 11/2001 | Dejaeger | |
| 2003/0055735 A1 * | 3/2003 | Cameron | G06Q 20/04 |
| | | | 705/27.1 |
| 2003/0120380 A1 * | 6/2003 | Bean | G07F 7/06 |
| | | | 700/231 |
| 2004/0113588 A1 * | 6/2004 | Mikuriya | H01M 10/4257 |
| | | | 320/128 |
| 2004/0189245 A1 | 9/2004 | Teraoka et al. | |
| 2005/0001591 A1 | 1/2005 | Nagamine et al. | |
| 2005/0102233 A1 * | 5/2005 | Park | G06Q 20/16 |
| | | | 705/44 |
| 2005/0236266 A1 | 10/2005 | Poole et al. | |
| 2006/0108979 A1 | 5/2006 | Daniel et al. | |
| 2006/0197502 A1 | 9/2006 | Kaminsky et al. | |
| 2006/0216586 A1 | 9/2006 | Tucholski | |
| 2006/0275656 A1 | 12/2006 | Feddrix et al. | |
| 2007/0069153 A1 | 3/2007 | Pai-Paranjape et al. | |
| 2007/0273327 A1 | 11/2007 | Daniel et al. | |
| 2008/0084178 A1 | 4/2008 | Dowd et al. | |
| 2008/0136378 A1 | 6/2008 | Iwahana et al. | |
| 2008/0160392 A1 | 7/2008 | Toya et al. | |
| 2008/0228613 A1 * | 9/2008 | Alexander | G06Q 20/102 |
| | | | 705/35 |
| 2008/0281732 A1 * | 11/2008 | Yamada | G06Q 10/30 |
| | | | 705/30 |
| 2008/0305387 A1 | 12/2008 | Murray et al. | |
| 2009/0092860 A1 | 4/2009 | Yamamoto et al. | |
| 2009/0153101 A1 | 6/2009 | Meyer et al. | |
| 2009/0212736 A1 | 8/2009 | Baarman et al. | |
| 2009/0212781 A1 | 8/2009 | Bertness et al. | |
| 2009/0233159 A1 | 9/2009 | Phillips et al. | |
| 2009/0281891 A1 * | 11/2009 | Walker | G06Q 30/0238 |
| | | | 705/14.38 |
| 2010/0052609 A1 | 3/2010 | Daniel et al. | |
| 2010/0169231 A1 | 7/2010 | Bowles et al. | |
| 2010/0205463 A1 * | 8/2010 | Magnusson | G06F 1/266 |
| | | | 713/300 |
| 2010/0247998 A1 | 9/2010 | Hostler et al. | |
| 2010/0274904 A1 | 10/2010 | Schirar et al. | |
| 2010/0295503 A1 | 11/2010 | Bourilkov et al. | |
| 2010/0312380 A1 | 12/2010 | Lowe et al. | |
| 2010/0320967 A1 | 12/2010 | Sa | |
| 2011/0057624 A1 | 3/2011 | Rizzo | |
| 2011/0181242 A1 | 7/2011 | Lee | |
| 2011/0225098 A1 | 9/2011 | Wolff et al. | |
| 2012/0074893 A1 | 3/2012 | Cole | |
| 2012/0109797 A1 * | 5/2012 | Shelton | B60L 3/0069 |
| | | | 705/34 |
| 2012/0276428 A1 | 11/2012 | Pendry | |
| 2013/0063073 A1 * | 3/2013 | Kawasaki | H02J 7/0027 |
| | | | 320/101 |
| 2013/0181661 A1 | 7/2013 | Workman et al. | |
| 2014/0310165 A1 * | 10/2014 | Yau | G07F 7/06 |
| | | | 705/39 |
| 2015/0045947 A1 | 2/2015 | Yau | |
| 2015/0140379 A1 | 5/2015 | Yau | |
| 2016/0028263 A1 | 1/2016 | Yau | |
| 2016/0197337 A1 | 7/2016 | Yau | |

FOREIGN PATENT DOCUMENTS

| | | |
|---|---|---|
| EP | 0577121 A1 | 1/1994 |
| EP | 0768724 A2 | 4/1997 |
| EP | 1136961 A1 | 9/2001 |
| EP | 1391961 A1 | 2/2004 |
| EP | 2015381 A2 | 1/2009 |
| EP | 2328173 A1 | 6/2011 |
| GB | 2042787 A | 9/1980 |
| JP | H06-249931 A | 9/1994 |
| JP | H09-153376 A | 6/1997 |
| JP | H10-221418 | 8/1998 |
| JP | H10-293874 | 11/1998 |
| JP | H11-31485 A | 2/1999 |
| JP | 2001023037 A | 1/2001 |
| JP | 2001096236 A | 4/2001 |
| JP | 2001222991 A | 8/2001 |
| JP | 2001266954 | 9/2001 |
| JP | 2004080984 A | 3/2004 |
| JP | 2004158264 A | 6/2004 |
| JP | 2004327252 A | 11/2004 |
| JP | 2008522354 A | 6/2008 |
| JP | 2008181855 A | 8/2008 |
| JP | 2008539559 A | 11/2008 |
| JP | 2009510697 A | 3/2009 |
| JP | 2009099542 A | 5/2009 |
| JP | 2010-211754 | 9/2010 |
| JP | 2011-054542 | 3/2011 |
| JP | 2011-514129 | 4/2011 |
| JP | 2011096233 A | 5/2011 |
| JP | 2011103104 | 5/2011 |
| JP | 2011-519121 | 6/2011 |
| JP | 2011210663 A | 10/2011 |
| JP | 2012055051 | 3/2012 |
| JP | 2012-070480 | 4/2012 |
| JP | 2002-199605 | 7/2012 |
| WO | WO 2001/095454 | 12/2001 |
| WO | WO 2003/069715 | 8/2003 |
| WO | WO 2001/054984 | 8/2004 |
| WO | WO 2009/105595 A2 | 8/2009 |
| WO | WO 2009/111743 | 9/2009 |
| WO | WO 2013/165597 | 11/2013 |

OTHER PUBLICATIONS

International Search Report and Written Opinion dated May 7, 2014 for Application No. PCT/US2013/065308.

(56) References Cited

OTHER PUBLICATIONS

International Search Report and Written Opinion dated Jul. 9, 2013 for Application No. PCT/US2013/030578.
International Search Report and Written Opinion dated Jul. 19, 2013 for Application No. PCT/US2013/031667.
International Search Report and Written Opinion dated Dec. 5, 2014 for Application No. PCT/US2014/052392.

* cited by examiner

TWO-WAY EXCHANGE VENDING

CROSS-REFERENCE TO RELATED APPLICATIONS

This application is a continuation of U.S. application Ser. No. 14/386,762, filed Sep. 19, 2014, which claims priority to and the benefit of International Application PCT/US2013/030578, filed Mar. 12, 2013, which, in turn, claims priority to and the benefit of U.S. Provisional Application No. 61/613,415 filed Mar. 20, 2012, the entire contents of which are incorporated herein by reference.

BACKGROUND OF THE INVENTION

Field of the Invention

This relates to the field of vending, and particularly to the field of two-way exchange based vending of reusable or recyclable products, such as, for example, rechargeable batteries.

Description of the Related Art

Batteries power a variety of devices. As more devices become battery powered, consumer demand for batteries increases. This results in the manufacturing and disposal of ever greater numbers of batteries, which can include precious metals or toxic materials such as, mercury, cadmium, or lead. Some people have begun using rechargeable batteries to save money and to minimize battery waste. However, rechargeable batteries require careful recharging, optimally achieved with expensive chargers, and are generally considered not to be as convenient as disposable batteries.

SUMMARY OF THE INVENTION

Some embodiments relate to a vending machine. In some embodiments, the vending machine can include, for example, a processor that controls the vending machine, a receiving module that receives a battery and collects and transmits battery information to the processor, a dispensing module that dispenses a battery in response to the receipt of the battery and the determination that the battery is associated with a valid subscription. In some embodiments, the processor determines if the received battery is associated with a valid subscription.

In some aspects, the vending machine can further include, for example, a receptacle to store a received battery, a storage area for the battery before it is dispensed, and/or a charging module, a network communications module that communicates across a network. In some aspects, the charging module determines if the received battery meets charging criteria, and/or recharges the received battery if the received battery meets the charging criteria. In some aspects, the processor can, for example, determine if the received battery is acceptable, which can include, for example, determining if the operating condition of the battery is acceptable and/or determining if the physical condition of the battery is acceptable.

In some aspects, the vending machine can further include, for example, a rejection module that returns a rejected battery to a user and/or a communication module that communicates information to a user. The communication module can, for example, receive user inputs and/or include a plurality of computer receivable codes that can, for example, provide information to direct an electronic device to a web-page, relate to a subscription related transaction, can be QR codes, and/or can be an emitted frequency.

Some embodiments relate to a method of using a vending machine. In some embodiments, the method includes, for example, receiving a battery, and dispensing a battery. In some embodiments, receiving the battery includes, for example, determining if the received battery is associated with a valid subscription, determining the type of received battery, and/or determining if the received battery is acceptable. In some embodiments, dispensing a battery includes, for example, dispensing the same type of battery as the received battery in response to the determination of the valid subscription associated with the battery and the acceptability of the battery.

In some aspects of the method, determining if the received battery is acceptable can include, for example, determining if the physical condition of the battery is acceptable, and/or determining if the operating condition of the battery is acceptable. In some aspects of the method, determining if the received battery is associated with a valid subscription can include, for example, determining if the received input is associated with a valid subscription, which received input can include, for example, at least one of a user name, a password, and an account number, and/or the received battery. In some aspects, determining if the received input is associated with a valid subscription can include, for example, determining if the received battery is a battery for use with the vending machine. In some aspects the method can further include, for example, determining the chargeability of the received battery, which can include, for example, determining the charge state of the received battery and/or determining if the received battery meets charging criteria.

In some aspects, the method can include, for example, rejecting the received battery if the received battery is not associated with a valid subscription, rejecting the received battery if the received battery is not acceptable, if the physical condition of the received battery is unacceptable, and/or if the operational condition of the received battery is unacceptable.

In some aspects, the vending system comprises a vending unit for vending products, the vending unit comprising a communication module and a unique identifier; a central computer comprising a processor; a database storing product information; and a communication unit, the central computer being located remote to the vending unit; a vending interface, the vending interface being located remote from the vending unit and configured to communicate with the central computer; and wherein the vending interface is configured to communicate the unique identifier of the vending unit and vending information to the central computer, and the central computer is configured to communicate the product information to the interface and to communicate vending instructions to the vending unit with the unique identifier.

In some aspects, a method of vending an item comprises receiving, in a central processor, a unique identifier for a vending unit; retrieving product information from a database corresponding to the unique identifier for the vending unit; transmitting the product information to an interface, wherein the interface is remote from the vending unit; receiving, in the central processor, a product selection from the interface; receiving payment for the product selection from a payment system; communicating the product selection to the vending unit corresponding to the unique identifier; and vending the selected product at the vending unit.

In some aspects, the unique identifier may be used to identify the vending unit into which an exchange item, such as a battery, is to be deposited in exchange for a new item, such as a fresh or charged battery.

The foregoing is a summary and thus contains, by necessity, simplifications, generalization, and omissions of detail; consequently, those skilled in the art will appreciate that the summary is illustrative only and is not intended to be in any way limiting. Other aspects, features, and advantages of the devices and/or processes and/or other subject matter described herein will become apparent in the teachings set forth herein. The summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The foregoing and other features of the present disclosure will become more fully apparent from the following description taken in conjunction with the accompanying drawings. Understanding that these drawings depict only several embodiments in accordance with the disclosure and are not to be considered limiting of its scope, the disclosure will be described with additional specificity and detail through use of the accompanying drawings.

DETAILED DESCRIPTION

Figure 1:
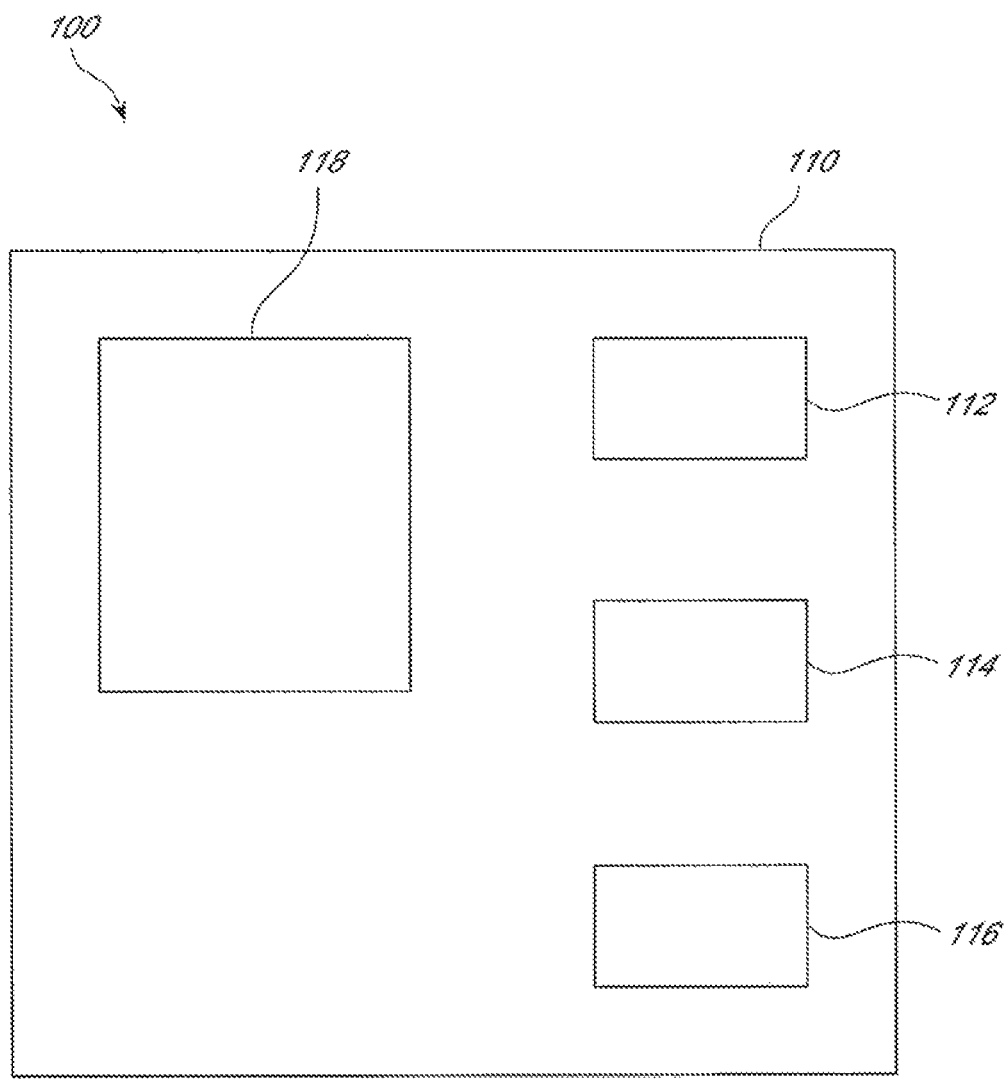
FIG. 1 depicts a front view of one embodiment of a two-way exchange based vending machine.

In the following detailed description, reference is made to the accompanying drawings, which form a part hereof. In the drawings, similar symbols typically identify similar components, unless context dictates otherwise. The illustrative embodiments described in the detailed description and drawings are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

Some embodiments disclosed herein relate to machines configured for two-way exchange based vending. In some embodiments, two-way exchange based vending can be subscription based, rental based, membership based (e.g. club membership), or based on any other system for tracking and/or regulating the exchange of a returned item for a new item. In some embodiments, the exchanged item can be any desired item, and can, in some embodiments, be a reusable item, such as, for example, a printer ink cartridge, a razor blade, a fuel cell such as, a portable fuel cell, a rechargeable battery, or any other item. Thus, in some embodiments, the machines can be configured to vend a variety of items, including, for example, of rechargeable batteries. In some embodiments, a two-way exchange based vending machine can comprise a variety of features in a variety of combinations. In some embodiments, these features can be configured to perform designated functions. Some embodiments include a vending machine capable of performing more or fewer functions than those described herein. In some embodiments, features of a two-way exchange based vending machine can include, for example, a communications module, a receiving module, a rejection module, a dispensing module, a charger, a processor, memory, a network communications module, and/or any other desired features. In some embodiments of a two-way exchange based vending machine, the two-way exchange based vending machine can communicate with a central control and monitoring station. In some embodiments of a two-way exchange based vending machine, the two-way exchange based vending machine can communicate with a central control and monitoring station over a network, such as, for example, the internet, a telecommunications network, or any other network. In some embodiments, the two-way exchange based vending machine can communicate information such as, for example, inventory status, functionality status of the two-way exchange based vending machine, service requests, subscription verification requests, and/or any other desired information to the central control and monitoring station.

Some embodiments disclosed herein relate to methods of two-way exchange based vending of, for example, rechargeable batteries. Some embodiments can include a variety steps performed in a variety of orders. Some embodiments can include more or fewer steps than those specifically outlined herein. In some embodiments, the steps outlined herein can be supplemented by additional steps. In some embodiments, methods of two-way exchange based vending of, for example, rechargeable batteries can include, for example, receiving a deposited item, verifying a subscription status, verifying battery condition, verifying inventory availability, dispensing a rechargeable battery, storing the received battery, and/or any other desired steps.

A two-way exchange based vending machine can comprise a variety of shapes, sizes and configurations. In some embodiments, a two-way exchange based vending machine can be sized for floor mounting, for wall mounting, for table/countertop mounting, or for any other desired mounting configuration. In some embodiments, a two-way exchange based vending machine can comprise an integral component of another vending machine, such as, for example, a two-way battery vending machine.

A two-way exchange based vending machine can be configured to vend a variety of products. In some embodiments, a two-way exchange based vending machine can be configured to vend rechargeable batteries. In some embodiments, a two-way exchange based vending machine can be configured to vend certain sizes of rechargeable batteries, such as, for example, AAA, AA, C, D, 9-volt, or any other battery size. In some embodiments, a two-way exchange based vending machine can be configured for vending other battery products such as, for example, a battery pack. In some embodiments, the vending machine is configured to vend a rechargeable battery pack. The battery pack may comprise a case comprising one or more cells of Li-ion 18650-type batteries. In some embodiments, the one or more Li-ion 18650-type batteries are connected to a port which comprises a USB port. The one or more batteries may be sealed within an enclosure which comprises the USB port to which the battery cells are connected. The battery power unit has internal circuitry which transforms the voltage to a voltage used in a handheld mobile device, such as a cellular telephone or a tablet computer. In this embodiment, the battery pack acts as a backup power supply for the handheld mobile device, providing a source from which to charge the internal battery of the mobile handheld device, or any device having a USB or USB-compatible charging connection.

In some embodiments of the two-way exchange based vending machine, a battery can be individually vended. In some embodiments of the two-way exchange based vending machine, a battery can be vended with other batteries. Thus, in some embodiments, a user may be able to specify the exact number of batteries for vending, and in other embodiments, a user may specify the number of packages of batteries for vending. In some embodiments of the two-way exchange based vending machine, the number of batteries that are vended corresponds to the number of acceptable batteries that are received by the two-way exchange based vending machine. In one embodiment, for example, the number of batteries that are vended by the two-way exchange based vending machine is the same as the number of acceptable batteries that are received by the two-way exchange based vending machine.

In some embodiments, one or several batteries can be vended as individual units, or can be vended packaged into groups of multiple batteries. In one embodiment, the batteries can be vended in a battery package that can be reusable or disposable. In some embodiments, the battery package can hold one or several batteries of a variety sizes, shapes, and/or types. In some embodiments, a battery package can be configured to hold, for example, one battery, two batteries, three batteries, four batteries, five batteries, eight batteries, ten batteries, twelve batteries, or any other desired number of batteries. In some embodiments, the battery package can contain one or several individual batteries, or one or several interconnected batteries. In some embodiments, the battery package can interconnect the batteries to provide a single power providing device, such as, for example, a battery pack.

The battery package can comprise a reusable battery case that can comprise any desired type of container or packaging such as, for example, an envelope, a bag, a box, shrink wrap, a blister pack, or any other type of container or packaging. The battery case can include features configured to allow opening and closing of the battery case such as, for example, a latch and a hinge, and the battery case can include internal features that secure one or several batteries within the battery case.

A two-way exchange based vending machine can comprise a variety of functionalities to facilitate vending. FIG. 1 depicts one embodiment of the two-way exchange based vending machine 100. As depicted in FIG. 1, the two-way exchange based vending machine 100 can comprise a body 110, a receiving module 112, a rejection module 114, a dispensing module 116, and a communications module 118.

In some embodiments, the body 110 can comprise the exterior of the two-way exchange based vending machine 100. The body 110 can be made of a variety of materials including, for example, natural, manmade, or any other desired materials. In some embodiments, for example, the body 110 can comprise a polymer or a metal. The body 110 can be designed and configured to house and protect the components and the inventory of the two-way exchange based vending machine 100. In some embodiments, the body 110 can include features to facilitate access to the components and the inventory of the two-way exchange based vending machine 100 such as, for example, a door, a lock, and/or any other desired features.

The two-way exchange based vending machine 100 can include the receiving module 112. In some embodiments, the receiving module 112 can be configured to receive one or several batteries, to identify the one or more received batteries, determine the acceptability of the one or more received batteries, to determine the operability of the one or more received batteries, to communicate the identification, acceptability, and chargeability information for the one or more received batteries to a controller, and/or to place the one or more received batteries in a storage receptacle for received batteries.

The receiving module 112 can include a variety of features and perform a variety of functionalities. In some embodiments, for example, the receiving module 112 can comprise a receiving receptacle configured to receive batteries, and a receiving identifier configured to identify one or more received batteries, a storage receptacle for storing received batteries, and features configured to transport the one or more received batteries from the receiving receptacle to the storage receptacle. In some embodiments, the receiving module can include each or some of these features. In some embodiments, the receiving module 112 can include additional features. In some embodiments, one or several of these features can be integrated into a single location.

In some embodiments, a receiving identifier can include features configured to identify the received batteries. This identification can, for example, comprise identification of a class or category of each returned battery. In some embodiments, this identification can comprise identification of some parameter associated with a battery. Advantageously, identification of a class or category of each returned battery can indicate a valid and/or active user subscription. In some embodiments, for example, a user receives one or several batteries in response to starting a subscription account, and retains the one or several batteries until the subscription account terminates. Each of these batteries can include features that identify the battery or allow identification of the battery as a subscription battery. As a user's possession of subscription batteries coincides with, in some embodiments, the active status of their subscription, the identification of a battery as a subscription battery simultaneously identifies a valid and/or active subscription.

In some embodiments, the receiving identifier can use a variety of techniques to determine the acceptability of the received battery. In some embodiments, the receiving identifier can include features configured to determine the physical condition of the received battery and/or configured to determine the operable condition of the received battery. In some embodiments, for example, the receiving identifier can include a scanner, a camera, or any other feature capable of capturing an image of the received battery. This image can, in some embodiments, be analyzed with different image analysis techniques to determine the condition of the exterior of the battery.

In some embodiments, the receiving identifier can include features configured to determine the operable condition of the received battery. These features can include, for example, one or more electrodes configured for electrical connection with the received battery. In some embodiments, the electrodes can be connected with features configured to determine the ability of the received battery to be recharged and meet performance requirements.

In some embodiments, the receiving module 112 can access the inventory module and can comprise features configured to transport a received battery to the inventory module.

As mentioned above, the two-way exchange based vending machine 100 can include the rejection module 114. In some embodiments, the rejection module 114 can be configured to return rejected batteries to the user. In some embodiments of the two-way exchange based vending machine 100, information obtained from the receiving module 112 can be used to determine whether to accept or reject received batteries. In some embodiments, for example, a received battery can be rejected if the physical condition of the received battery is inadequate. In some embodiments, for example, a received battery can be rejected if the operable condition of the battery is inadequate. In some embodiments, for example, a received battery can be rejected if the physical condition and the operable condition of the battery are inadequate. In some embodiment, the rejection module 114 can be configured to reject a battery, for example, if the battery is a non-supported type or brand of battery, if the battery does not include a proper identification feature or based on any other desired criteria.

The rejection module 114 can include a variety of features and components. In some embodiments, the rejection module 114 can include, for example, a rejection receptacle. In some embodiments, the rejection module 114 can include additional features. In some embodiments, one or several of these features can be integrated into a single location. In some embodiments, the rejection module can comprise an integral portion of the receiving module 112 and/or the dispensing module 116.

In some embodiments, the rejection receptacle can be configured to receive rejected batteries from the receiving module 112 and to present the rejected batteries to the user. In some embodiments, the rejection receptacle can comprise, for example, a user accessible tray.

The two-way exchange based vending machine 100 can include the dispensing module 116. The dispensing module 116 can be configured to remove one or more batteries from the inventory module and dispense the one or more batteries to the user. In some embodiments, the dispensing module 116 can dispense the number of batteries associated with a transaction. In some embodiments, the dispensing module 116 can be configured to dispense new batteries to a user starting or expanding a subscription. In some embodiments, the dispensing module 116 can be configured to dispense the same number of charged batteries to a user as the number of returned batteries that were received from a user. In some embodiments, the dispensing module 116 can be configured to dispense fewer charged batteries to a user than the number of returned batteries received from the user.

The dispensing module 116 can include a variety of features and functionalities. In some embodiments, the dispensing module 116 can include, for example dispensing features configured to deliver one or more batteries from the inventory module to a user, and any other desired features.

Some embodiments of the two-way exchange based vending machine 100 include the communications module 118. The communications module 118 can be configured to communicate with a user of the two-way exchange based vending machine 100. Specifically, in some embodiments of the two-way exchange based vending machine 100, the communications module 118 can be configured to communicate information to the user and/or to receive inputs from the user. In some embodiments, the communications module 118 can be static and/or dynamic. Thus, in some embodiments, the communications module 118 can comprise active features capable of providing information in response to an input, and in some embodiments, the communications module 118 may constantly display the same information. Thus, in some embodiments, the communications module 118 can comprise text, images, coding, or other static features located on a portion of the two-way exchange based vending machine 100, and in some embodiments, the communications module 118 can include, for example, a display screen, a speaker, or any other feature or feature combination capable of communicating information to a user of the two-way exchange based vending machine 100. In some embodiments, a communications module 118 can comprise one or several input features such as, for example, a key pad, a touch screen, a track pad, a microphone, voice recognition hardware and software, or any other feature or features capable of receiving a user input.

In some embodiments, the communications module 118 comprises features configured to facilitate online interaction with the two-way exchange based vending machine 100. Specifically, in some embodiments, the communications module 118 can comprise features to facilitate interaction with a web-site. In some embodiments, the web-site can have a communications link with the two-way exchange based vending machine 100 to transmit information relating to user interaction with the web-site to the two-way exchange based vending machine 100. Thus, in some embodiments, information relating to a transaction performed at the web-site can be communicated to the two-way exchange based vending machine 100.

In some embodiments, the features of the two-way exchange based vending machine 100, and the communications module 118 configured to facilitate accessing of a web-site can include, for example, a processor, memory, and other features configured for accessing the internet. In some embodiments, the communications module 118 can be configured to provide information to a user to facilitate the user's accessing the web-site via a user device. In some embodiments, these features can comprise, for example, instructions for internet access, a web-address, or any feature configured to communicate the address of the web-site to or to guide a user to the website. In one embodiment, these features can include, for example, a computer receivable code. In some embodiments, the computer receivable code can comprise, a for example, a barcode, including, a linear barcode, a 2-D barcode, a QR code, or any other type of barcode. In some embodiments, the computer receivable code can comprise, for example, an emitted signal, such as, a signal emitted by an RFID tag. In some embodiments, the communications module 118 can comprise a plurality of computer receivable codes, and in some embodiments, each code can facilitate user access to a unique web-page associated with each of the computer receivable codes. In some embodiments, the communications module 118 can display the computer receivable code in response to a user input. In some embodiments, the computer receivable code can be displayed on the two-way exchange based vending machine, such as, via a label or sticker applied to the two-way exchange based vending machine.

In some embodiments, a user can use an electronic device to receive the computer receivable code. The electronic device can comprise any desired electronic device, including, for example, a device capable of accessing the internet. In some embodiments the device capable of accessing the internet can comprise, for example, a mobile device such as a handheld device like a Smartphone, a cellular phone, a tablet, a laptop computer, a PDA device, or any other desired portable device.

In some embodiments, the electronic device can comprise features capable of receiving the computer receivable code. In some embodiments these features can comprise, a camera, a scanner, a sensor, a receiver, or any other desired features.

In one specific embodiment, for example, the communications module 118 can comprise a plurality of computer receivable codes, and specifically, a plurality of QR codes. In one embodiment, each of these computer receivable codes is associated with a transaction relating to a subscription, such as, for example, starting a subscription, expanding a subscription, such as, for example, increasing the number of batteries associated with the subscription, increasing the length of the subscription, or increasing the number of allowed recharges with the subscription, contracting a subscription, such as, for example, decreasing the number of batteries associated with the subscription, decreasing the length of the subscription, or decreasing the number of allowed recharges with the subscription, a change in payment source associated with the subscription, a change in the identity of the subscriber, or any other subscription related transaction. In one specific embodiment, the user can use a camera to receive the information stored in the computer receivable code. This information can be configured to connect the user's electronic device with a web-page for the completion of a transaction associated with the computer receivable code. After completion of this transaction, the web-site can communicate information reflecting the transaction to the two-way exchange based vending machine 100, which can then proceed to receive batteries, dispense batteries, or perform any other desired function.

In one embodiment of the two-way exchange based vending machine 100, the communications module 118 can comprise a touch screen configured to communicate information to the two-way exchange based vending machine 100 user and to receive inputs from the user.

In some embodiments, the communications module 118 of the two-way exchange based vending machine 100 can communicate information to a user including, for example, the availability and costs of a new or expanded subscription, information relating to a user account and/or user subscription account, such as, for example, the status of the users subscription account, the acceptability of deposited batteries, and/or any other desired information.

In some embodiments, the communications module 118 transmits information to a user and receives inputs from a user relating to a transaction. In some embodiments of two-way exchange based vending machine 100, the communications module 118 can prompt a user for an input identifying the user account and/or user subscription account. In some embodiments, the communications module 118 can be further configured to receive user inputs identifying the user account and/or the user subscription account. These inputs can include, for example, a username and password, a unique user identification number, an input received by scanning a computer readable code, an input received by swiping an item containing identification features such as a magnetic strip or an RFID tag or any other features. In some embodiment, a user can be provided with an identification feature, such as, for example, a card or component including, a magnetic strip, a computer readable code such as, for example, a barcode, an integrated circuit, such as, for example, a smart card, a signal emitting features such as, for example, an RFID tag, or any other identifying component. In some embodiments, this identification feature can be configured to assist in the determination of the subscription status of a user, and can, for example, facilitate the input of information to the two-way exchange based vending machine 100.

The controller can comprise, for example, a processor and a memory comprising stored instructions. In some embodiments, the processor can have a communications link with some of the features of the two-way exchange based vending machine 100 to receive inputs from these features. In some embodiments, the processor can further provide electronic signals to the features of two-way exchange based vending machine 100 that control or direct the operation of these features. In some embodiments, the processor can receive electronic signals from each of the components of the two-way exchange based vending machine 100. In some embodiments, the processor can receive and process the user input, and in response to the input, direct the communication of information relating to the requested transaction to the user. This information can include, for example, account status, received battery acceptability, available battery inventory, pricing and availability of a subscription and/or an expanded subscription, and/or any other desired information. This information can allow the user to provide further inputs to the two-way exchange based vending machine 100 to select the user desired transaction. Advantageously, the use of the communications module 118 allows the two-way exchange based vending machine 100 to communicate information relating to products to the user, and the user to input information relating to the desired transaction into the two-way exchange based vending machine 100.

The two-way exchange based vending machine 100 can include additional features not depicted in FIG. 1. In some embodiments, the two-way exchange based vending machine 100 may be configured to accept electronic payment via a mobile telephone. In some embodiments, the payment may be received from a cellular service provider, such as when a user texts a specific code to a specific number, which instructs the cellular network to charge a user's account. In some embodiments, the payment may be made in a dedicated application, or app, on the user's mobile phone, or any other electronic payment method. These features can include, among others, a payment module. A payment module can include any feature or features configured to receive payment from a user. In some embodiments, a payment module can be configured to receive cash payment or to receive electronic payment. In some embodiments, a payment module can be a scanner configured for use with, for example, a credit card, or a debit card, or a cash input device. A person of skill in the art will recognize that the present disclosure is not limited to any specific feature for receiving payment, but that it broadly encompasses all features capable of receiving payment. In some embodiments, the payment module can be used, for example, to start a new subscription or to expand an existing subscription. In some embodiments, a subscription can be started or expanded with an on-line, in store, or two-way vending machine transaction. In some embodiments, the subscription can be associated by a single person, by a group of people, or by an entity.

In some embodiments, the two-way exchange based vending machine 100 can comprise a network communications module. The network communications module can be configured to communicate with another entity on a network. In some embodiments, the network communications module can be configured to communicate with a server across a network, such as, for example, across the internet, and can include features configured for wired or wireless communication. In some embodiments, the network communications module may be configured to communicate with other two-way exchange based vending machines 100, a server, or other network and network-connected entities using the internet, a local area network, wide area network, RF communication, IR communication, cellular telephone networks, 3G and/or 4G networks, Wi-Fi, Bluetooth, or any other desired wireless or wired connection method.

The network communications module can be configured, in some embodiments, to transmit information to the server relating to the user, to a user account, to the user subscription account, to a user transaction, to user payment details, and/or any other desired information. In some embodiments in which the user identifies himself to the two-way exchange based vending machine 100, the network communications module can transmit this identification information to the server. The server can determine the status of the user account and/or user subscription account, and provide this information to the two-way exchange based vending machine 100. In some embodiments in which the user makes a payment to the two-way exchange based vending machine 100, the two-way exchange based vending machine 100 can provide information relating to the payment to the server. This information can include, for example, the amount of payment, whether a credit should be associated with the user account, payment account information such as, for example, a credit card or bank card number or identifier, or any other payment information. The server can then associate this payment information with the user account.

In some embodiments, the two-way exchange based vending machine 100 can provide information relating to purchases by the user, such as, for example, details relating to the subscription purchased by the user or any other desired information. This information can be associated with the user account and/or user subscription account. In some embodiments, the information may relate to the number of batteries a user's subscription entitles the user to have checked out or in his/her possession. The information may include the status of batteries, battery packs, fuel cells, or other items a user's subscription entitles the user to receive from the exchange based service via two-way exchange based vending machines 100. In some embodiments, a user may provide instructions via a subscription or other method which requests the user have access to a battery, battery pack, etc., available for pick-up at any two-way exchange based vending machine 100.

In some embodiments, the network communications module can communicate information to the server relating to the status of the two-way exchange based vending machine 100. Thus, in some embodiments, the network communications module can send a signal to the server when the two-way exchange based vending machine 100 requires servicing such as, for example, replenishing of the stock of charged batteries or other vended items, removal of deposited discharged batteries or other used items, removal of discharged batteries that the two-way exchange based vending machine 100 cannot charge, or any other required service. A person of skill in the art will recognize that the network communications module can communicate a variety of other information with the server, and that the present disclosure is not limited to the above-described specific embodiments.

Some embodiments of the two-way exchange based vending machine 100 can include, for example, a charging module. The charging module can comprise features configured to recharge discharged batteries that are received by the two-way exchange based vending machine 100. In some embodiments, the charging module can be configured to recharge any desired battery configuration, including, for example, one or several individual batteries, one or several battery packs, and/or one or several pluralities of linked batteries. In some embodiments, the charging module can be configured to test each of the received batteries to determine a charge state. If the battery is discharged, the charging module can be configured to determine if the battery meets the criteria for charging at the two-way exchange based vending machine 100. If the battery does not meet the criteria for charging at the two-way exchange based vending machine 100, then the battery is placed in a received battery inventory. If the battery meets the criteria for charging at the two-way exchange based vending machine 100, then the battery is charged by the two-way exchange based vending machine 100.

The charging module can include a variety of features including, for example, loading and unloading features, charging features, and a charge controller. In some embodiments the loading and unloading features are configured to load a discharged battery into the charger, and to unload a recharged battery from the charger. In some embodiments, the loading and unloading features can be configured to orient a battery so that the battery orientation matches a preferred charger orientation, and to then place the oriented battery in the charger.

The charging features can be configured for creating an electrical connection with the terminals of the battery to allow battery charging. In some embodiments, the charging features can comprise, for example, one or several electrodes.

The charge controller can be configured to recharge a battery. In some embodiments, the charge controller can recharge the battery according to a predetermined charging profile. In some embodiments, the charging profile can be the same for all batteries. In some embodiments, the charging profile can be varied based on one or several battery characteristics. Thus, in some embodiments, the charging profile can accelerate or decelerate battery charging based on one or several battery characteristics.

Some embodiments of the two-way exchange based vending machine 100 can include, for example, an inventory module. The inventory module can be configured to hold and store separate classes of batteries. In some embodiments, the inventory module can be divided into, for example, received batteries and batteries for dispensing. In some embodiments, the received batteries can be stored in a discharged inventory, and in some embodiments, the batteries for dispensing can be stored in a fresh battery inventory. In some further embodiments, the inventory module can store received batteries in either a battery recharging inventory or in a battery pickup inventory. In some embodiments, the batteries in the battery recharging inventory have been determined to be rechargeable at the two-way exchange based vending machine 100, and batteries in the battery pickup inventory have been determined to be non-rechargeable at the two-way exchange based vending machine 100.

Figure 2:
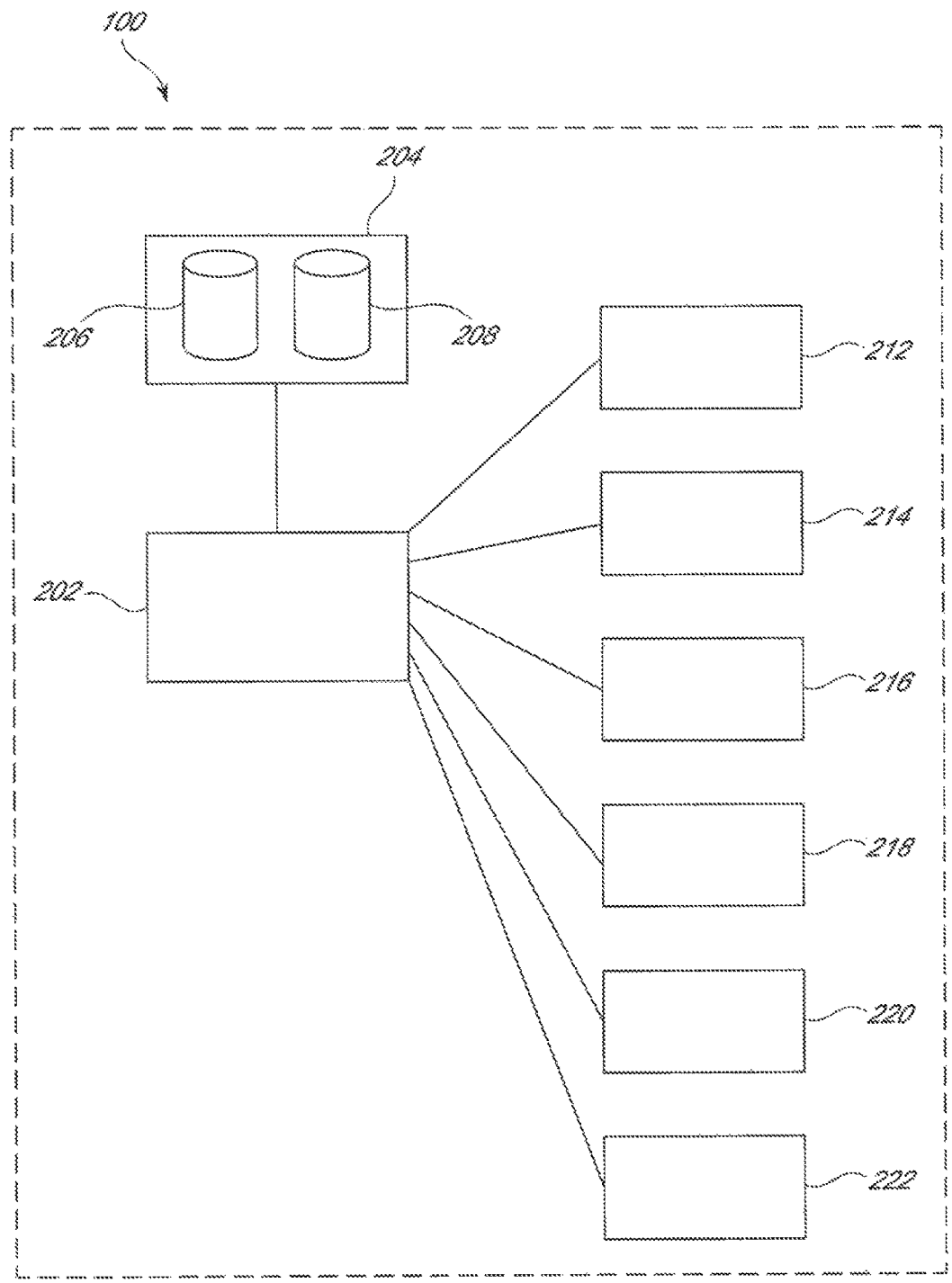
FIG. 2 is a schematic illustration of one embodiment of the functional blocks of a two-way exchange vending machine.

The details of the interconnectivity of the different components of the two-way exchange based vending machine 100 are depicted in FIG. 2. As seen in FIG. 2, the components of the two-way exchange based vending machine 100 are interconnected. One embodiment of the two-way exchange based vending machine 100 can comprise a processor 202, memory 204 comprising, one or several databases 206, 208, the receiving module 212, the rejection module 214, the dispensing module 216, the communications module 218, the charging module 220, and the inventory module 222.

As discussed above, the processor 202 can be configured to receive inputs from the different modules and components of the two-way exchange based vending machine 100 and to process these inputs based on instructions stored within the memory.

As depicted in FIG. 2, the memory 204 can be communicatingly connected with the processor 202 to allow the processor to access the memory 204 so as to receive information from the memory 204 and to store information in the memory 204. In some embodiments, and as depicted in FIG. 2, the memory 204 comprises a plurality of databases 206, 208. In some embodiments, the memory 204 can comprise a single database. In some embodiments the memory 204 can comprise a plurality of databases such as, two, three, four, five, ten, twenty, one hundred, or any other number of databases.

The databases 206, 208 can each comprise one or several organized collections of data. In some embodiments, the data stored in each of the databases 206, 208 can relate to the modules 212, 214, 216, 218, 220, 222. In some embodiments, for example, this information can relate to the inventory of the two-way exchange based vending machine 100, including, for example, the number of received batteries in the inventory, the number of batteries for distribution in the inventory, the number of batteries awaiting recharging at the two-way exchange based vending machine 100, the number of batteries that cannot be recharged by the two-way exchange based vending machine 100, or any other inventory information. In some embodiments, for example, this information can relate to user subscription accounts and/or user accounts.

As depicted in FIG. 2, each of the receiving module 212, the rejection module 214, the dispensing module 216, the communications module 218, the charging module 220, and the inventory module 222 are communicatingly connected with the processor 202. This connection can allow the processor to send control signals to each of the modules 212, 214, 216, 218, 220, 222 and receive signals from each of these modules 212, 214, 216, 218, 220, 222.

The communicating connection between each of the modules 212, 214, 216, 218, 220, 222, the processor and the memory 204 and the processor can be a wired or wireless connection.

Method of Operation of the Subscription Based Rechargeable Battery Vending Machine The features of the two-way exchange based vending machine 100 can be controlled to achieve the desired vending and/or receipt of one or several batteries. FIGS. 3 through 6 depict different methods of operating different aspects of the two-way exchange based vending machine 100, focusing on the method of distributing an item and/or on the method of receiving an item and/or a rechargeable battery.

Figure 3:
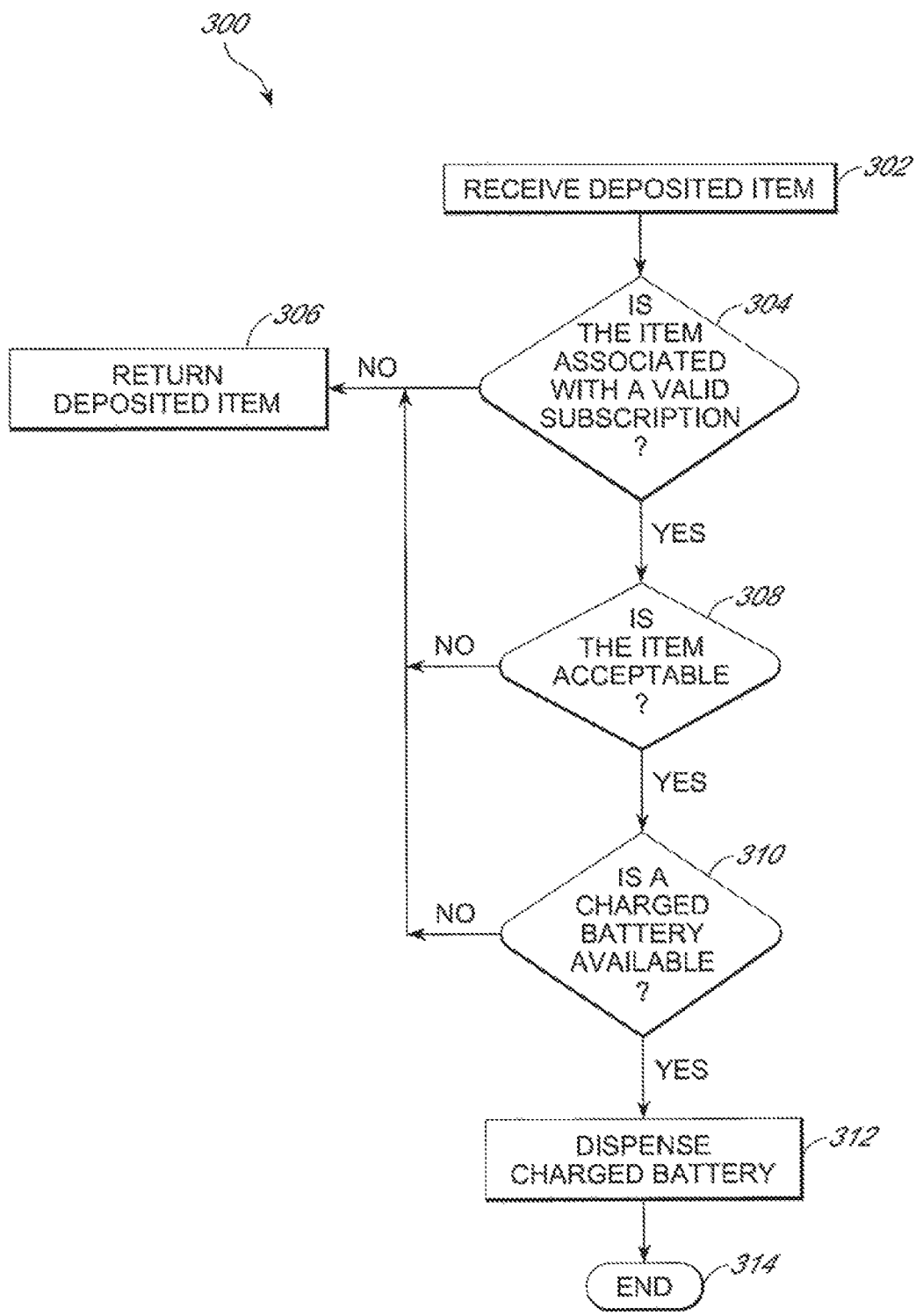
FIG. 3 is a flow chart illustrating one embodiment of a method of operation of a two-way exchange based vending machine to distribute one or several rechargeable batteries.

FIG. 3 depicts one embodiment of a process 300 for operating the two-way exchange based vending machine 100 to distribute one or several rechargeable batteries. In some embodiments, the process 300 begins when a deposited item is received at block 302. This item can be received, as discussed above, via the receiving module. Having received item, the receiving module 112 can collect information relating to the identification and condition of the item and transmit this information to the processor 202.

The process 300 then optimally moves to decision state 304, and determines if the item is associated with a valid subscription. As discussed above, the determination of a valid and/or active subscription can be performed in a variety of ways. In one embodiment, each battery for use with the two-way exchange based vending machine 100 can include an identifying feature or characteristic that allows identification of batteries as being for use with the two-way exchange based vending machine 100. As also discussed above, in some embodiments, a user will only receive such a battery at the time of creating a subscription account, and will only maintain possession of the battery for the duration of their subscription account. Thus, in such an embodiment, identification of the battery as being of the type for use with the two-way exchange based vending machine 100 identifies a valid subscription. Optimally, the vended battery can include code, markings, or other information relating to the subscription status or subscription expiration or to the subscriber identity. As also discussed above, in some embodiments, a valid subscription can be identified through a user input, such as, for example, a user name and password, a unique account identifier, or any other distinguishing input.

If the item is not associated with a valid and/or active subscription, the process 300 moves to block 306 and the two-way exchange based vending machine 100 returns the deposited item to the user.

If the item is associated with a valid subscription the process 300 moves to decision state 308 and determines if the item is acceptable. In some embodiments, the determination of the acceptability of the item can include, for example, determining if the item is a battery, determining the type of battery, determining if the battery is for use with the two-way exchange based vending machine 100, determining if the battery is in acceptable physical condition, and/or determining if the battery is in acceptable operational condition. In some embodiments, the acceptability of the battery can be determined through the presence of one or several identification features, through physical attributes of the battery, or in any other desired fashion. In some embodiments, for example, the battery voltage, internal resistance/impedance, battery shape, the presence of a computer readable code on the battery, or any other battery attribute identifying a battery or battery condition and/or performance can be used. If the deposited item is not acceptable, then the process moves to block 306 and the two-way exchange based vending machine 100 returns the deposited item to the user.

If the deposited item is acceptable, the process 300 moves to decision state 310 and determines if a charged battery of the required type is available. In some embodiments, this includes determining whether the inventory of charged batteries of the required type is depleted. This can include, for example, querying a database to determine inventory status of charged batteries of the required type, or requesting and receiving signals from the inventory module relating to the availability of required batteries. If the process 300 determines that no charged battery of the required type is available, then the process moves to block 306 and the two-way exchange based vending machine 100 returns the deposited item to the user.

If a charged battery of the required type is available, the process moves to block 312 and dispenses the charged battery. In some embodiments, this step can be performed by the dispensing module. After the charged battery is dispensed, the process terminates at block 314.

A person of skill in the art will recognize that a process 300 for operating the two-way exchange based vending machine 100 to distribute one or several rechargeable batteries can include some or all of the above discussed steps, as well as steps additional to the above requested steps. A person of skill in the art will further recognize that a process 300 for operating the two-way exchange based vending machine 100 to distribute one or several rechargeable batteries can include the above listed steps performed in any order, including in an order different than that shown above.

Figure 4:
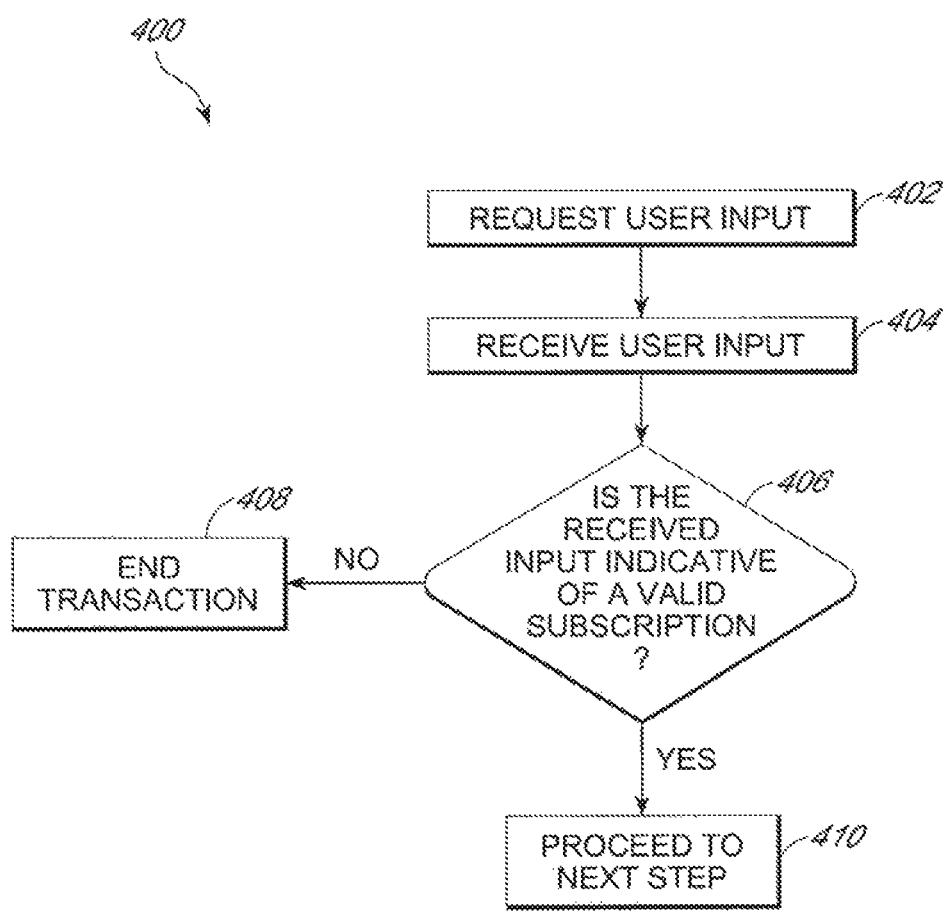
FIG. 4 is a flow chart illustrating one embodiment of a method of operating a two-way exchange based vending machine to verify a subscription.

FIG. 4 depicts one embodiment of a process 400 for operating the two-way exchange based vending machine 100 to verify a subscription. As depicted in FIG. 4, the process begins at block 402 and requests a user input. In some embodiments, the communications module can communicate the request to the user to provide the input. This request can be in the form of a visual or audible prompt to provide the input.

The process 400 then moves to block 404 and receives the user input. As discussed above, the input can comprise a variety of actions, including, for example, depositing an item in the receiving module of the two-way exchange based vending machine 100, inputting a username and password or any other unique identifier into the two-way exchange based vending machine 100, or any way through which an input can be provided.

The process 400 then moves to decision state 406 and determines if the received input is indicative of a valid and/or active subscription. In embodiments in which the input comprises the deposit of a battery that is identifiable as a battery for use with the two-way exchange based vending machine 100, identification of the battery also determines that a subscription is valid and/or active. In some embodiments in which an input such as a username and password, or other unique identifier is received, the determination of whether the received input is indicative of a valid and/or active subscription can involve querying the memory 204 to verify the subscription status, and/or communication with the server to determine the subscription status associated with the username and password and/or the unique identifier. If the process 400 determines that the subscription is not valid and/or active, then the process 400 terminates at block 408.

If the process 400 determines that the received input is indicative of a valid and/or active subscription, then the process 400 moves to block 410 and proceeds to the next step depicted in FIG. 4.

A person of skill in the art will recognize that a process 400 for operating the two-way exchange based vending machine 100 to verify a subscription can include some or all of the above discussed steps, as well as steps additional to the above requested steps. A person of skill in the art will further recognize that a process 400 for operating the two-way exchange based vending machine 100 to verify a subscription can include the above listed steps performed in any order, including in an order different than that shown above.

Figure 5:
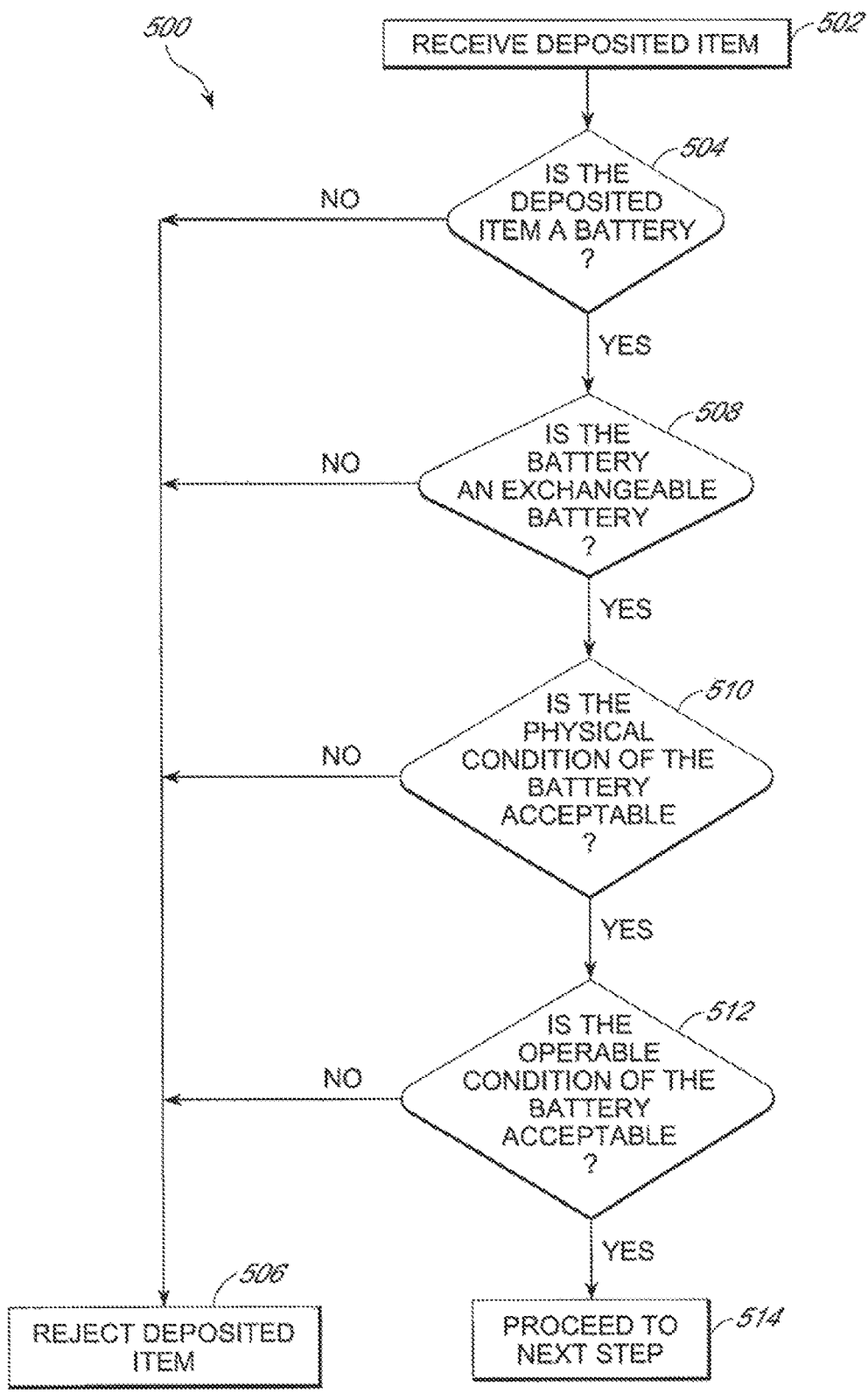
FIG. 5 is a flow chart illustrating one embodiment of a method of operating a two-way exchange based vending machine to determine whether to accept a deposited item.

FIG. 5 depicts one embodiment of a process operating the two-way exchange based vending machine 100 to determine whether to accept the deposited item. In some embodiments, the process 500 begins at block 502 and the deposited item is received. As discussed above, in some embodiments, the deposited item is received in the receiving module.

The process 500 then moves to decision state 504 and determines if the deposited item is a battery. In some embodiment, the determination of whether the deposited item is a battery can be performed, for example, by the receiving module. In some embodiment, the receiving module can collect information relating to the deposited item and use the information to determine if the deposited item is a battery. This information can include, for example, the weight of the battery, the size of the battery, and/or any other desired characteristics of the deposited item. In some embodiments, this information can include the presence of a computer readable code associated with the battery, and the information stored in computer readable code. In some embodiments, the computer readable code can comprise, for example, a barcode. In some embodiments, this information can include, a frequency emitted by a feature associated with the battery, such as, for example, by an RFID tag. In some embodiments, the receiving module 112 can be configured to collect image data relating to the deposited item and use the image data to determine if the deposited item is a battery. If process 500 determines that the deposited item is not a battery, then the process moves to block 506 and the two-way exchange based vending machine 100 rejects the deposited item.

If the process 500 determines that the deposited item is a battery, then the process 500 moves to decision state 508 and determines if the battery is an exchangeable battery. In some embodiments, this determination can be made by determining whether the battery is a battery of the type for use with the two-way exchange based vending machine 100. In some embodiments, the determination of decision state 508 can be simultaneously performed with the determination of decision state 504. As discussed above, this determination can be made based on the presence of an identification feature, such as, for example, a computer readable code, a frequency emission component such as an RFID tag, or any other identifying feature or trait. In some embodiments, the identifying feature or trait can include, for example, a battery parameter such as, for example, voltage, internal resistance/impedance, or any other desired battery parameter. If the process 500 determines that the battery is not an exchangeable battery, then the process moves to block 506 and the two-way exchange based vending machine 100 rejects the deposited battery.

If the process 500 determines that the battery is an exchangeable battery, then the process 500 moves to decision state 510 and determines if the physical condition of the battery is acceptable. In some embodiments information collected by the receiving module can be analyzed to determine if the physical condition of the battery is acceptable. Specifically, in some embodiments image data collected by the receiving module can be analyzed to determine the battery is in acceptable physical condition. In some embodiments, acceptable physical condition can include limited or no damage to a battery label and/or limited or no damage to any other portion of the battery. If the process determines that the battery is not in acceptable physical condition, then the process moves to block 506 and the two-way exchange based vending machine 100 rejects the deposited battery.

If the process 500 determines that the battery is in acceptable physical condition, then the process moves to decision state 512 and determines if the operable condition of the battery is acceptable. As discussed above, information relating to the operable condition of the battery can be collected by components of the receiving module. This information can include, for example, battery characteristics such as charging and discharging characteristics such as, for example, voltage, internal resistance/impedance, or any other desired charging and/or discharging characteristic. If the process 500 determines that the operable condition of the battery is not acceptable, then the process moves to block 506 and the two-way exchange based vending machine 100 rejects the deposited battery.

If the process 500 determines that the received input is indicative of a valid and/or active subscription, then the process 500 moves to block 514 and proceeds to the next step depicted in FIG. 5.

A person of skill in the art will recognize that a process 500 for operating the two-way exchange based vending machine 100 to determine whether to accept the deposited item can include some or all of the above discussed steps, as well as steps additional to the above requested steps. A person of skill in the art will further recognize that a process 500 for operating the two-way exchange based vending machine 100 to determine whether to accept the deposited item can include the above listed steps performed in any order, including in an order different than that shown above.

Figure 6:
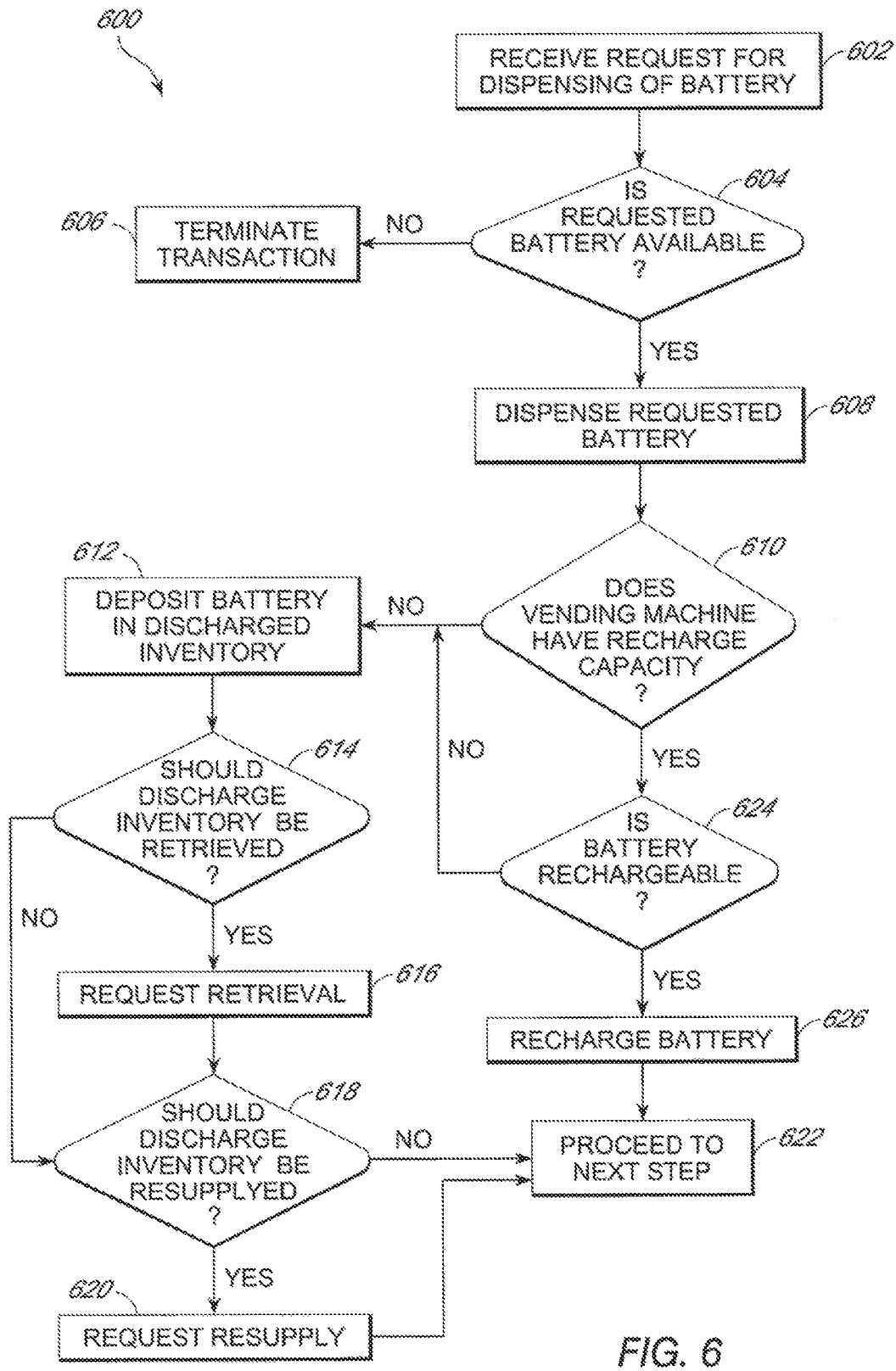
FIG. 6 is a flow chart illustrating one embodiment of a method of operating a two-way exchange based vending machine to distribute one or several rechargeable batteries.

FIG. 6 depicts one embodiment of a process 600 for managing two-way exchange based vending machine inventories and for dispensing a rechargeable battery. Process 600 begins at block 602 when a request for dispensing of a battery is received. This request is communicated to the dispensing module from the processor.

The process 600 continues to decision state 604 and determines if the requested battery is available. In some embodiments, the determination of whether the requested battery is available can be made by querying the memory 204 for inventory information and then using the inventory information to determine if the requested battery is available. In some embodiments, the determination of whether the requested battery is available can be made by receiving signals from the inventory module relating to the inventory information of the requested battery, which received signals can be used to determine if the requested battery is available. If the process 600 determines that the requested battery is unavailable, then the transaction terminates at block 606.

If the process 600 determines that the requested battery is available, then the process 600 moves to block 608 and the requested battery is dispensed. As discussed above, in some embodiments the dispensing of the battery can be achieved by the dispensing module 116. In some embodiments, dispensing the requested battery may be delayed, or a battery may be requested to be dispensed at a two-way exchange based vending machine 100 other than the one in which a battery is deposited. In some embodiments, upon depositing an empty, discharged, or spent battery or battery pack, the user may request that the system "hold" a fresh, new, or charged battery or battery pack within the system. The user may indicate at which two-way exchange based vending machine 100 the user wishes to receive the "on-hold" battery or battery pack. In some embodiments, the user need not specify a particular two-way exchange based vending machine 100, but may generally request that one be available for pick-up within the system at any two-way exchange based vending machine 100.

In some embodiments, a spent, discharged, or used battery or battery pack may be deposited into the two-way exchange based vending machine 100, and the user may request credit to his/her account or subscription in lieu of dispensing a new, fresh, or charged battery or battery pack.

The process 600 then moves to decision state 610 and determines if the two-way exchange based vending machine 100 has a recharging capacity. In some embodiments, this determination is made by determining whether the two-way exchange based vending machine 100 has a charging module 220, and if the charging module 220 is capable of charging the battery. If the process 600 determines that two-way exchange based vending machine 100 does not have recharge capacity, then the process 600 moves to block 612 and the battery is deposited in the discharged inventory.

Returning again to decision state 610, if the process 600 determines that the two-way exchange based vending machine 100 has recharge capacity, then the process 600 moves to decision state 624 and determines if the battery is rechargeable. As discussed above, in some embodiments, the charging module 220 can be configured to test each of the received batteries to determine a charge state. If the battery is discharged, the charging module 220 can be configured to determine if the battery meets the criteria for charging at the two-way exchange based vending machine 100. These criteria can include, for example, the rate with which the battery can be recharged, the maximum level of charge the battery can accept, internal resistance in the battery to recharging, and/or any other desired criteria. If the process 600 determines that the battery is not rechargeable in decision state 624, then the process 600 moves to block 612 and deposits the battery in the discharged inventory.

If the process 600 determines that the battery is rechargeable, then the process moves to block 626 and the battery is recharged. The process 600 then moves to block 622 and proceeds to the next step depicted in FIG. 6.

Returning again to block 612, after the battery is deposited in the discharged inventory, the process moves to decision state 614 and determines whether the discharged inventory should be retrieved. In some embodiments, this determination is made with information obtained by querying the inventory module for information relating to the status of the discharged inventory. In some embodiments, the determination is made with information obtained from querying the memory for information relating to the status of the discharged inventory. If the discharged inventory is above some threshold, then the processor 202 of the two-way exchange based vending machine 100 can determine that the discharged inventory should be retrieved from the two-way exchange based vending machine 100. If the discharged inventory is below some threshold, then the processor 202 of the two-way exchange based vending machine 100 can determine that the discharged inventory should not be retrieved from the two-way exchange based vending machine 100.

If the process 600 determines that the discharged inventory should be retrieved, then the process moves to block 616 and requests retrieval of the discharged inventory. In some embodiments, the request for retrieval of the discharged inventory can be made by network communications module. In this embodiments the network communications module can communicate, for example, with the server and request retrieval of the discharged inventory.

The process then proceeds to decision state 618 and determines if the fresh battery inventory should be resupplied. In some embodiments, this determination is made with information obtained by querying the inventory module for information relating to the status of the fresh battery inventory. In some embodiments, the determination is made with information obtained from querying the memory for information relating to the status of the fresh battery inventory. If the fresh battery inventory is above some threshold, then the processor of the two-way exchange based vending machine 100 can determine that the fresh battery inventory should not be resupplied. If the fresh battery inventory is below some threshold, then the processor of the two-way exchange based vending machine 100 can determine that the fresh battery inventory should be resupplied. If the process 600 determines that the fresh battery inventory should not be resupplied, then the process 600 then moves to block 622 and proceeds to the next step depicted in FIG. 6.

If the process 600 determines that the fresh battery inventory should be resupplied, then the process moves to block 620 and the two-way exchange based vending machine 100 requests resupply. In some embodiments, the request for resupply of the fresh battery inventory can be made by network communications module. In this embodiments the network communications module can communicate, for example, with the server and request resupply of the fresh battery inventory. After the process 600 requests resupply of the fresh battery inventory, the process 600 moves to block 622 and proceeds to the next step depicted in FIG. 6.

Returning again to decision state 614, if the process 600 determines that the discharged inventory should not be retrieved, the process moves to decision state 618 and determines if the fresh battery inventory should be resupplied. If the process 600 determines that the fresh battery inventory should not be resupplied, then the process 600 then moves to block 622 and proceeds to the next step depicted in FIG. 6.

If the process 600 determines that the fresh battery inventory should be resupplied, then the process moves to block 620 and the two-way exchange based vending machine 100 requests resupply. After the process 600 requests resupply of the fresh battery inventory, the process 600 moves to block 622 and proceeds to the next step depicted in FIG. 6.

A person of skill in the art will recognize that a process 600 for managing two-way exchange based vending machine inventories and for dispensing a rechargeable battery can include some or all of the above discussed steps, as well as steps additional to the above requested steps. A person of skill in the art will further recognize that a process 600 for managing two-way exchange based vending machine inventories and for dispensing a rechargeable battery can include the above listed steps performed in any order, including in an order different than that shown above.

Figure 7:
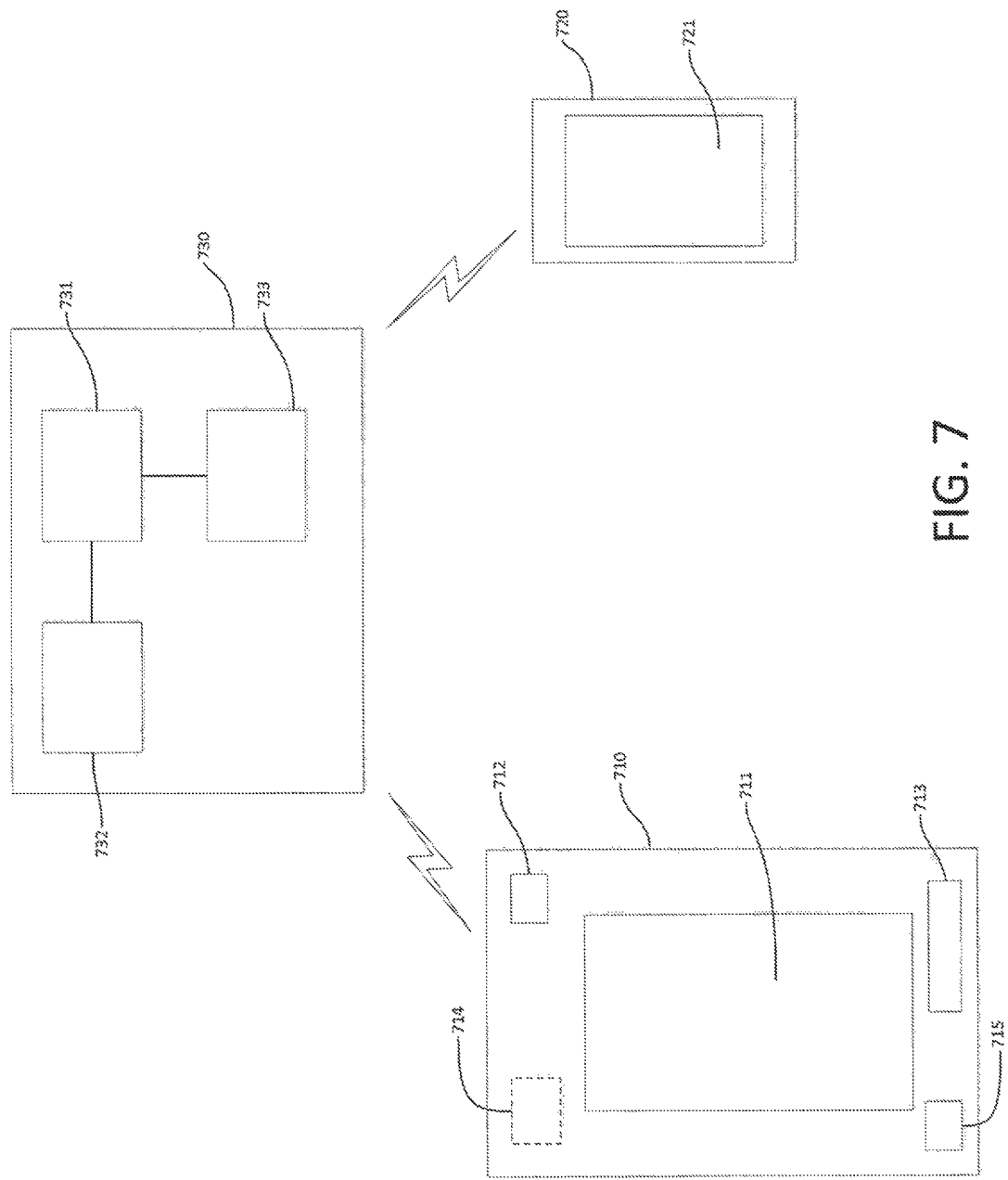
FIG. 7 depicts a "headless" vending system.

FIG. 7 illustrates a system for vending items using a "headless" or "dumb" vending machine. A vending system 700 comprises a vending unit 710, a mobile electronic device 720, and a central computer 730. Vending system 700 may vend batteries as described elsewhere herein. In some embodiments, vending system 700 may be configured to vend any desired product, for example, beverages, candy, food, books, music, electronics, or any other desired product. In some embodiments, the vending system 700 may be configured to provide a two-way exchange based vending procedure as described herein.

The vending unit 710 comprises a product display portion 711, a vending unit identifier 712, a dispensing port 713, a communication module 714, and a receiving port 715. It is notable that the vending unit 710 does not have a user interface, such as a payment port, a graphical interface comprising buttons for selecting a product to vend, or other similar features. Because the vending unit 710 lacks these features, it can be referred to as a "headless" or "dumb" vending machine.

The product display portion 711 may be a window into the vending unit 710 through which the products, including the product prices, may be seen. In some embodiments, the production display portion 711 may be a list of products, or chart or compilation of images of the products contained within the vending unit 710 and available for vending.

The vending unit identifier 712 may be a unique identifier assigned to a particular vending unit 710 which identifies the vending unit 710 among a plurality of other vending units. The vending unit identifier 712 may be an alphanumeric name or code, a QR code, an RFID tag, a barcode, or other similar unique identifier. The vending unit identifier 712 may be used to identify the particular vending unit 710 to a network or server which will be described below.

The dispensing port 713 is disposed in the vending unit 710 and provides a path through which a product is dispensed from the vending unit 710. The communication module 714 is located within the vending unit 710, and is connected to the vending machinery within the vending unit 710. The vending machinery is the mechanism by which a product is selected for dispensing and then dispensed through dispensing port 713. The communications module 714 is configured to communicate with a server or network which will be described later herein. The communication module 714 may comprise a receiver and/or a transmitter configured to communicate wirelessly with a local area network using Wi-Fi or similar communications protocols, with a wide area network over the internet, using a cellular network, a 3G network, a 4G network, Bluetooth, Zigbee, IEEE 802.11x, or any other desired wireless communication method or protocol.

The receiving port 715 is disposed in the vending unit and provides a path through which a user may deposit an item, such as a spent or used battery as part of a two-way exchange described herein. An item received in the receiving port 715 may be taken into the vending unit 710 and sorted and/or stored within the unit 710. In some embodiments, the received unit may be exchanged for a similar item.

The vending system 100 may advantageously include a mobile electronic device 720 such as a cellular phone, smart phone, personal digital assistant, tablet computer, laptop or notebook computer, netbook, ultrabook, or any other mobile computing or communication device. The mobile electronic device 720 has an interface 721 configured to receive a user's input. The interface 721 may be a touch-screen type interface, a graphical user interface, an alphanumeric key pad, or other similar known mobile device interface. The mobile communication device 720. In some embodiments, the mobile electronic device 720 and its interface 721 may substitute as the user interface that is present on standard vending machines. Instead of selecting products and providing payment on the vending unit 710, these functions are performed using the mobile electronic device 720 via an internet site using a mobile web browser, or a dedicated app, or other similar method.

The mobile electronic device 720 is in wireless communication with a central computer 730. Central computer 730 may be a server, network node, or other similar device known in the art. Central computer 730 comprises a processor 731, which is in electrical communication with a database 732 and a communication unit 733. The communication unit 733 is configured to communicate with both the communications module 714 of the vending unit 710, and the mobile electronic device 720. The communication unit 733 is configured to both transmit and receive signals to and from the vending unit 710 and the mobile electronic device 720. The database 732 may store information regarding the price of items in the vending units 710, users of the vending system 700, subscribers, and other information as will be described herein. The database 732 may also store information regarding a user's exchange subscription information, such as how many items has the user subscribed and/or paid for, or how many items does the user currently have checked out.

The processor 731 controls and coordinates the operations of the central computer 730 and the vending system 700. In some embodiments, the communication unit is configured to communicate with other devices or networks, such as the internet, credit card accounts, cellular telephone accounts, PayPal, e-wallets such as Google wallet, and any other desired system in order to facilitate payment and to process payments for products to be vended. The communication unit 733 may be configured to communicate via a wireless or wired connection or both. For example, the central computer may be configured to wirelessly communicate with vending unit 710, and may have a wired connection to financial networks, the internet, or other networks to facilitate processing electronic payments.

In some embodiments, the central computer 730 may be a web server or a host for an e-commerce site. A user may register for an account via a web server or similar network interface, and deposit money into an account or sign up for a subscription service for using the vending system 700. The user's account information may be stored in the database 732.

Figure 8:
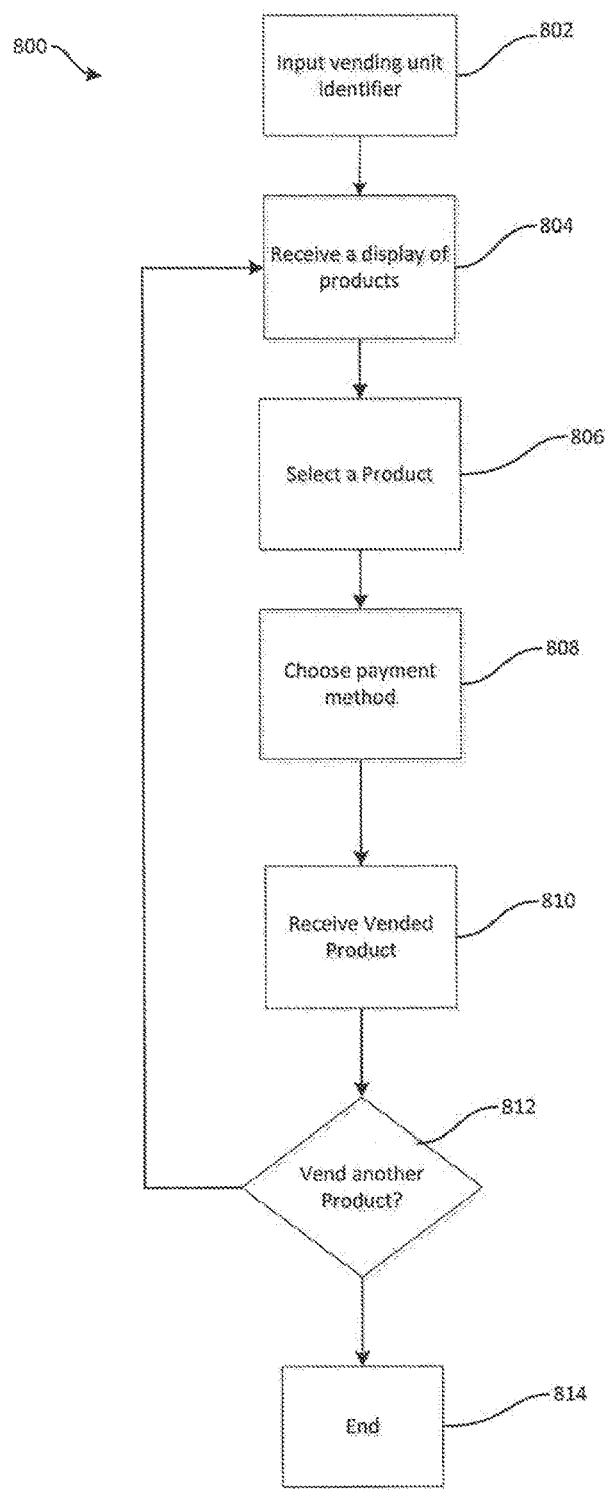
FIG. 8 is a flow chart illustrating one embodiment of a method of a user interacting with a vending system using a mobile electronic device.

FIG. 8 depicts a flowchart of how the vending system 700 may be used. Process 800 illustrates a user's interaction with vending system 100. A user having a mobile electronic device 720 may approach the vending unit 710. In some embodiments, the user identifies the unique identifier associated with the vending unit 710. The process begins in block 802, wherein the vending unit identifier 712 is input into the mobile electronic device 720. As one example, the vending unit identifier 712 may be a QR code. The user scans the QR code using the mobile electronic device 720, and the mobile electronic device 720 navigates to an internet site or dedicated mobile application (app) for the vending system 700. In another example, the user opens an internet site or dedicated App for the vending system 700. Within the App or the site, the user may input the unique vending unit identifier into the app or site, such as an alphanumeric code or identification number for the vending machine. In some embodiments, the user may scan a barcode on the vending unit using a mobile electronic device 720.

Upon inputting the vending unit identifier, the process 800 moves to block 804, where the user receives a display of the products contained within the vending unit 710 for which the vending unit identifier 712 was input. The internet site or mobile app may display a list, icon, description, or other indicia of the products or items available for purchase from the vending unit 710. As an example, the items may be batteries, soda, food, or other items.

In some embodiments, the items may be also displayed in the product display portion 711. In some embodiments, the product display portion 711 comprises images or logos, or descriptions of the products available, rather than being a window onto the actual products. Where a user can see the indicia of products available to vend, the need to physically display all the products available in vending unit 710 through glass or other transparent medium, the overall storage capacity and efficiency of the vending units 710 may be improved.

A user selects a product or item for vending in block 806. The selection can be made by tapping, touching, clicking, or otherwise selecting a link or icon associated with the desired product. For example, the mobile app may display the various beverages available for vending at a particular vending unit 710. The user may tap an icon on his or her mobile electronic device 720 corresponding to a cola beverage.

In some embodiments, the products are displayed in display portion 711, and a code is associated with each product. The code associated with the product can be used for selecting a product or item to vend. For example, in some embodiments, the vending unit identifier 712 may be instructions having a number to send an SMS or text message to for access to the vending system 100. For example, a user may text the code associated with a particular product to the number code of the vending unit 710, and the product will be vended via dispensing port 713. This system operation will be described below. The vending system 700 may be associated with an account or cellular carrier, such that the price of the vended product is deducted from the account balance, or is charged to the user's cellular telephone bill.

Following a user's selection, process 800 moves to block 808, wherein the user selects a method of payment. The internet site or dedicated app for the vending system 100 may provide payment options. For example, in some embodiments, the vending system 100 may be configured to charge a dedicated vending account, deduct from an account, charge to an input credit card, charge a credit card a user has previously placed on file, debit a user's bank account, or charge a purchase to a cellular telephone account. These methods are exemplary, and one of skill in the art would understand that other methods of electronic payment are possible without departing from the scope of this disclosure. The user selects the method of payment from the app or the internet site. Once payment is confirmed and received, process 800 moves to block 810, wherein the vending unit 710 dispenses the selected product via dispensing port 713, and the user receives the vended product. Upon receipt of the product, the internet site or app may ask the user whether the user desires to vend another product in decision state 812. If the user desires another product, the process 800 returns to block 804, wherein the list or icons of products is again displayed. If the user does not desire a further product, the user may indicate that no further products are desired on the internet site or mobile app, and the process ends in block 814.

Figure 9:
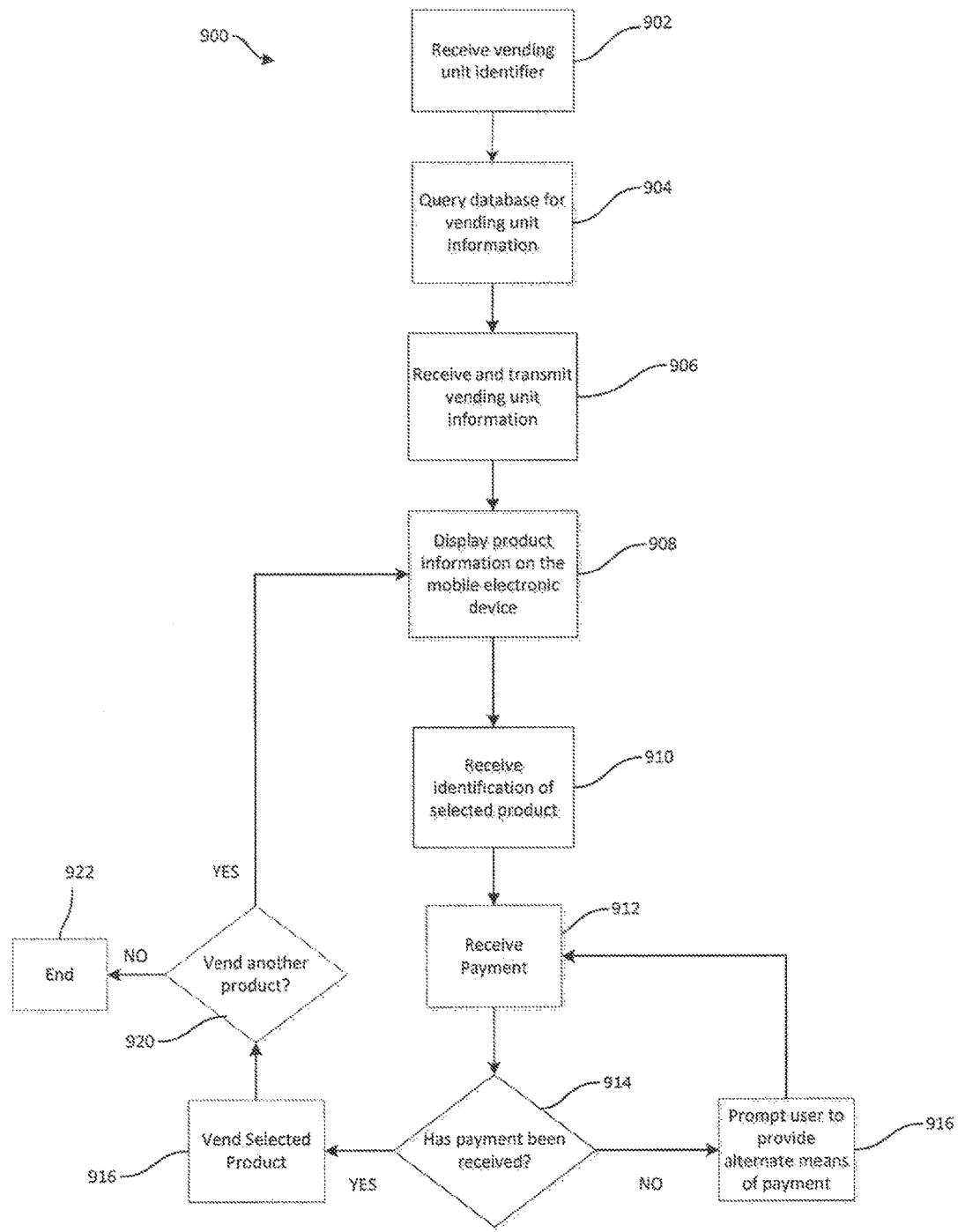
FIG. 9 is a flow chart illustrating one embodiment of the operation of a vending system using a mobile electronic device.

FIG. 9 is a flowchart illustrating the process of the vending system 700. Process 900 begins in block 902 where central computer 730 receives the vending unit identifier 712 from the mobile electronic device 720. The user may input the vending unit identifier 712 into the mobile electronic device 720 as described elsewhere herein. Once inputted into, for example, the internet site or dedicated app for the vending system 700, internet site or dedicated app transmits the vending unit identifier 712 to the central computer 730.

Upon receipt of the vending unit identifier 712, process 900 moves to block 904, wherein the processor 731 queries the database 732 for information regarding the identified vending unit 710. The information regarding the vending unit 710 may comprise the products available in the vending unit 710, prices, location of the vending unit 710, inventory levels, and any other desired information.

The process next moves to block 906, wherein the processor receives this information 710 from the database 730 and prepares it for transmission. The vending unit information is transmitted to the mobile electronic device 720 using the communication unit 733. The information is received on the mobile electronic device 720 via an internet site or a dedicated app. The app receives the vending unit information and provides a display of the available products with their corresponding prices on the mobile electronic device interface 721.

A user may select a product for vending via the interface 721, and the process 900 moves to block 910, wherein the central computer 730 receives the identity of the selected product via the communication unit 733. The processor 731 may then retrieve the price or cost associated with the selected product from, for example, the database 732, or from the signal generated by the mobile electronic device 720 with the product selection, received in the communication unit 733. In some embodiments, the user may also select a quantity of products to be dispensed using the internet site accessed with a mobile web browser or the dedicated app.

The process next moves to block 912, wherein the central computer 730 receives payment from the user. The payment may be made by different methods. For example, a user may have an account associated with the vending system 700 into which the user has deposited money. The account information and user identity maybe stored in the database 732, and accessed when a user accesses the internet site or dedicated app, using, for example, a log-in or other known method of verifying credentials. The processor 731 may access the database to verify the identity and/or account of the user. In some embodiments, the user may deposit money into the user's account using the dedicated app or the internet site on the mobile electronic device, such as by using a credit card, a PayPal account, or any other desired method. In some embodiments, a user may use a network terminal or other internet or network access point to deposit money into the user's account. The balance in the user's account may be stored in the database 732, and as the user selects a product, the processor debits the user's account, and tracks the remaining value. In some embodiments, the processor may be configured to provide account balance information to the user's mobile electronic device via the communication unit, by sending an SMS text message, providing an account information section in the dedicated app, or on the internet site.

In some embodiments, the user's account may be associated with another account, such as a credit card, a cellular phone account, PayPal account, an e-wallet, such as Google wallet, or any other desired account. The processor may be configured to access these accounts via the communication unit to request or receive payment. For example, a user may associate his account with a cellular telephone account. By ordering a product from the vending system 700 using the mobile phone, the central computer 730 may request and receive payment from the cellular telephone provider, and the payment will show up on the user's next cellular telephone bill. In some embodiments, a user may enter credit card information, including a credit card number into the internet site or dedicated app, and directly charge the credit card without having an account with the vending system 700.

In some embodiments, the user may order a product from a vending unit 710 by sending an SMS text message to a specific code identifying a specific vending unit 710 as described above. In this embodiment, the central computer may request and receive payment from the cellular provider, which payment is then passed along to the user through the cellular telephone bill.

Process 900 next moves to decision state 914 wherein it is determined whether a payment has been received. If no payment has been received, the process moves to block 916, wherein the user is prompted to select a different payment method, or to cancel the transaction. Payment may not be received, if, for example, the user's account does not have sufficient funds to cover the price of a product, or if a credit card is declined. If no payment is received, the central computer 730 sends a signal to the mobile electronic device 720 indicating that no payment has been received, and requesting the user select an alternate form of payment, or cancel the transaction.

If the central computer receives a signal confirming an electronic payment, or receives payment by any other method, the process moves to block 916, where the central computer 730 sends a signal to the vending unit 710 which was identified in block 902, instructing it to vend the selected product. The processor 730, upon receiving confirmation of payment, sends a signal via communication unit 733, which is received by the communications module 714 of the vending unit 710. The signal received from the central computer 730 by the communications module 714 of the vending unit 710 instructs the vending unit to dispense or vend the selected product.

Process 900 next moves to block 918, wherein the vending unit 710 vends the desired product via dispensing port 713. Upon dispensing the selected product, the process 900 moves to decision state 920, where the user is asked via the mobile electronic device 720, whether further vending purchases are desired. If no further purchases are required, the process 900 ends in block 922. If another purchase is desired, the process returns to block 908, and the product information is again displayed on the mobile electronic device 720.

In some embodiments, the vending unit identifier 712 may be a scanner, such as a barcode scanner. In such embodiments of the vending system 700, the internet site or dedicated app may generate a computer readable code, such as a barcode, in response to a request to purchase a specific item. The user may scan the computer readable code on the mobile electronic device. The vending unit 710 may additionally comprise a processor and memory configured to receive the scanned code, and convert the scanned code into an instruction. For example, a user request to buy a specific product from a vending unit 710. Once payment has been received as described elsewhere herein, the internet site or dedicated app generates a barcode which encodes the command to dispense the selected product. The user positions the barcode on the mobile electronic device 720 near the scanner, and the vending unit 710 receives the barcode, and uses the processor and memory to decode the barcode, and execute the encoded instruction—in this case, to dispense the selected product. In such embodiments, communications module 714 may be not be required in the vending unit 710.

Figure 10:
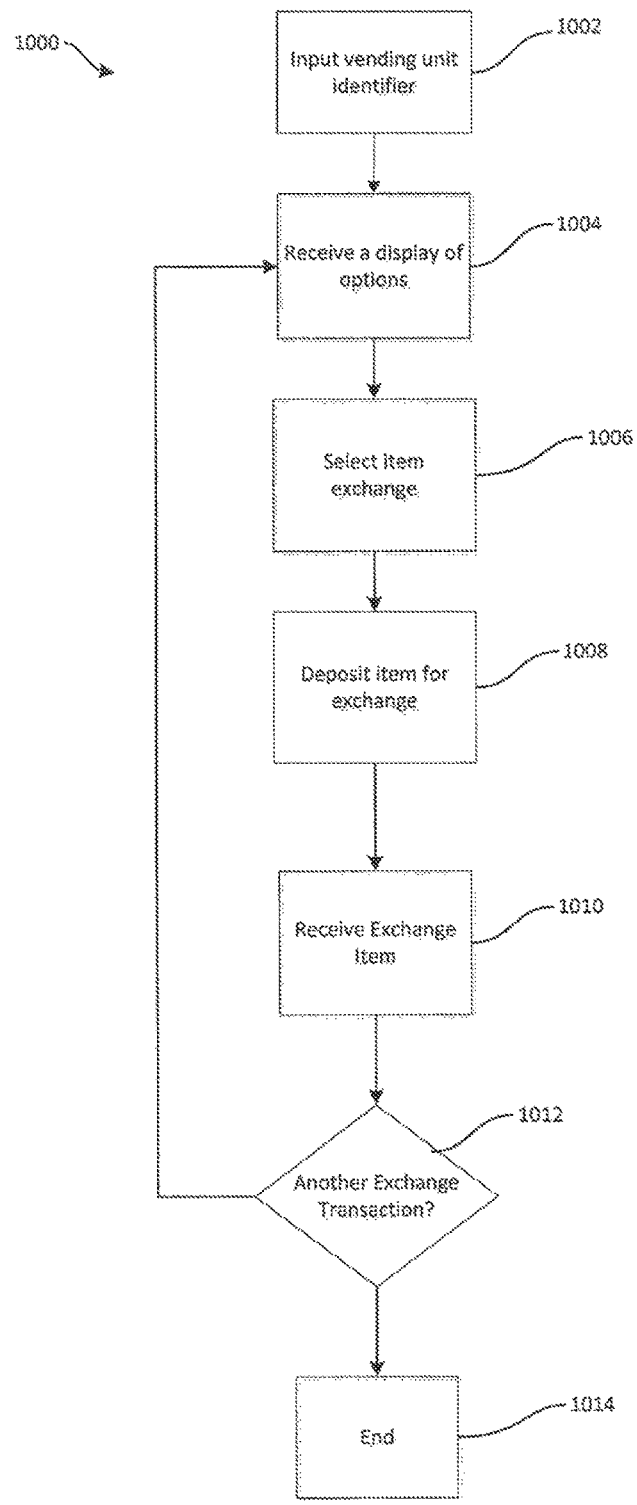
FIG. 10 is a flow chart illustrating one embodiment of a two-way exchange transaction with a vending system using a mobile electronic device.

FIG. 10 illustrates a system for a two-way exchange vending process using a "headless" or "dumb" vending machine. Process 1000 illustrates a user's interaction with vending system 100 in an exchange process. A user having a mobile electronic device 720 may approach the vending unit 710. In some embodiments, the user identifies the unique identifier associated with the vending unit 710. The process begins in block 1002, wherein the vending unit identifier 712 is input into the mobile electronic device 720. As one example, the vending unit identifier 712 may be a QR code. The user scans the QR code using the mobile electronic device 720, and the mobile electronic device 720 navigates to an internet site or dedicated mobile application (app) for the vending system 700. In another example, the user opens an internet site or dedicated App for the vending system 700. Within the App or the site, the user may input the unique vending unit identifier into the app or site, such as an alphanumeric code or identification number for the vending machine. In some embodiments, the user may scan a barcode on the vending unit using a mobile electronic device 720.

Upon inputting the vending unit identifier, the process 1000 moves to block 1004, where the user receives a display of the products contained within the vending unit 710 for which the vending unit identifier 712 was input. The internet site or mobile app may display a list of options, including conducting an exchange transaction or a purchase transaction.

In some embodiments, the items available for exchange be also displayed in the product display portion 711. In some embodiments, the product display portion 711 comprises images or logos, or descriptions of the products available, rather than being a window onto the actual products. Where a user can see the indicia of products available for exchange, the need to physically display all the products available in vending unit 710 through glass or other transparent medium, the overall storage capacity and efficiency of the vending units 710 may be improved.

A user selects an item exchange transaction in block 1006. The mobile electronic device 720 may access the user's exchange subscription on the database 732, and provide the user options for the exchange on the display 721. For example, the mobile app may display the exchange information for a user's battery exchange subscription. In some embodiments, a user may not have a subscription, but may have an exchange account for exchanging batteries or other items. The user may select an exchange transaction, and the mobile app may prompt the user to deposit the item for exchange. The user may tap an icon on his or her mobile electronic device 720 acknowledging that an item will be deposited into receiving port 715.

In some embodiments, the user may text the code associated with a particular exchange transaction located on the vending unit identifier 712. The central computer 730 may generate a response text message confirming the user's selection of an exchange transaction, which the user receives on the mobile electronic device 720.

The process 1000 moves to block 1008, wherein a user, the user may deposit an item, such as a used or spent battery, into the receiving port 715. Upon receiving the item, the vending unit may communicate the receipt of the exchange item to the central computer. The central computer 730 may then generate a follow-up text message which confirms the deposit of the exchange item.

Following a user's deposit, process 1000 moves to block 1010, wherein the user receives an exchange item, such as a battery. Upon receiving the deposit item, and upon receiving an instruction from the central computer 730 to provide an exchange item, the vending unit 710 dispenses the exchange product via dispensing port 713, and the user receives the exchange item. Upon receipt of the product, the internet site or app may ask the user whether the user desires to vend another product in decision state 1012. If the user desires to exchange another item, the process 1000 returns to block 1004, wherein the list or icons of exchange options is again displayed. If the user does not desire a further transaction, the user may indicate that no further exchanges or products are desired on the internet site or mobile app, and the process ends in block 1014. In some embodiments, a user may select a product for vending and an item for exchange on the same vending unit 710 during a single session.

The steps of the above described methods are exemplary only. The steps of the processes may be performed in any order desired, and steps may be added or omitted from the above processes, as desired.

The technology is operational with numerous other general purpose or special purpose computing system environments or configurations. Examples of well known computing systems, environments, and/or configurations that can be suitable for use with the invention include, but are not limited to, personal computers, server computers, hand-held or laptop devices, multiprocessor systems, processor-based systems, programmable consumer electronics, network PCs, minicomputers, mainframe computers, distributed computing environments that include any of the above systems or devices, and the like.

As used herein, instructions refer to computer-implemented steps for processing information in the system. Instructions can be implemented in software, firmware or hardware and include any type of programmed step undertaken by components of the system.

A processor may be any conventional general purpose single- or multi-chip processor such as a Pentium® processor, a Pentium™ Pro processor, a 8051 processor, a MIPS® processor, a Power PC® processor, or an Alpha™' processor. In addition, the processor may be any conventional special purpose processor such as a digital signal processor or a graphics processor. The processor typically has conventional address lines, conventional data lines, and one or more conventional control lines.

The system is comprised of various modules as discussed in detail. As can be appreciated by one of ordinary skill in the art, each of the modules comprises various sub-routines, procedures, definitional statements and macros. Each of the modules are typically separately compiled and linked into a single executable program. Therefore, the description of each of the modules is used for convenience to describe the functionality of the preferred system. Thus, the processes that are undergone by each of the modules may be arbitrarily redistributed to one of the other modules, combined together in a single module, or made available in, for example, a shareable dynamic link library.

The system may be used in connection with various operating systems such as Linux®, UNIX® or Microsoft Windows®.

The system may be written in any conventional programming language such as C, C++, BASIC, Pascal, or Java, and run under a conventional operating system. C, C++, BASIC, Pascal, Java, and FORTRAN are industry standard programming languages for which many commercial compilers can be used to create executable code. The system may also be written using interpreted languages such as Perl, Python or Ruby.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more example embodiments, the functions and methods described may be implemented in hardware, software, or firmware executed on a processor, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The foregoing description details certain embodiments of the systems, devices, and methods disclosed herein. It will be appreciated, however, that no matter how detailed the foregoing appears in text, the systems, devices, and methods can be practiced in many ways. As is also stated above, it should be noted that the use of particular terminology when describing certain features or aspects of the invention should not be taken to imply that the terminology is being redefined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment can be included with other depicted embodiments in any combination. For example, any of the various components described herein and/or depicted in the Figures may be combined, interchanged or excluded from other embodiments.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting.

What is claimed is:

1. A vending system comprising:
    a vending unit for vending and receiving products, the vending unit comprising a communication module and a unique identifier; and
    a central computer, remote from the vending unit, the central computer comprising:
        a processor;
        a database associating the unique identifier with product information for products available at the vending unit; and
        a communication unit, the central computer being in communication with the vending unit;
    wherein the central computer is configured to receive the unique identifier indicative of the vending unit from a user vending interface running on a user interface device, the user interface device being located remotely from the vending unit;
    wherein the central computer is configured to identify the vending unit into which a received product is deposited based on the unique identifier received from the user vending interface, and
    wherein the central computer is configured to determine from the database the identity of products available at the vending unit in response to receiving the unique identifier from the user vending interface and to communicate an option for completing a transaction at the vending unit to the user vending interface.

2. The vending system of claim 1, wherein the vending unit is configured to transmit the unique identifier to the user vending interface.

3. The vending system of claim 2, wherein the unique identifier is transmitted to the user vending interface via a computer readable code configured to be read by the user interface device.

4. The vending system of claim 3, wherein the computer readable code is an RFID tag.

5. The vending system of claim 1, wherein the central computer is configured to communicate the returnability of a previously vended product to the user vending interface.

6. The vending system of claim 1, wherein the option comprises exchanging a previously vended product for an available product.

7. The vending system of claim 1, wherein the central computer is configured to communicate account information to the user vending interface in response to receiving the unique identifier from the user vending interface.

8. The vending system of claim 1, wherein the central computer is configured to communicate a code to the user vending interface in response to a selection of a transaction, and wherein the vending unit is configured to read the code from the user interface device and complete a selected transaction in response to reading the code.

9. The vending system of claim 1, wherein the central computer is in communication with a plurality of vending units, each of the plurality of vending units comprising a communication module and a unique identifier, and wherein the database associates the unique identifier of each of the plurality of vending units with product information for products available at the vending unit identified by the unique identifier.

* * * * *